(12) United States Patent
Leonida

(10) Patent No.: US 7,935,456 B2
(45) Date of Patent: May 3, 2011

(54) FLUID CONDUIT FOR AN ELECTROCHEMICAL CELL AND METHOD OF ASSEMBLING THE SAME

(76) Inventor: Andrei Leonida, West Hartford, CT (US)

( * ) Notice: Subject to any disclaimer, the term of this patent is extended or adjusted under 35 U.S.C. 154(b) by 880 days.

(21) Appl. No.: 11/517,112

(22) Filed: Sep. 6, 2006

(65) Prior Publication Data

US 2007/0059582 A1    Mar. 15, 2007

Related U.S. Application Data

(60) Provisional application No. 60/717,007, filed on Sep. 13, 2005.

(51) Int. Cl.
   H01M 8/04    (2006.01)
   H01M 8/24    (2006.01)
   H01M 2/40    (2006.01)
   H01M 2/38    (2006.01)

(52) U.S. Cl. .................................... 429/514; 429/457

(58) Field of Classification Search ............. 429/38, 429/35, 39, 34; 138/118
   See application file for complete search history.

(56) References Cited

U.S. PATENT DOCUMENTS

| | | |
|---|---|---|
| 3,814,631 A | 6/1974 | Warszawski et al. |
| 4,331,284 A | 5/1982 | Schulz et al. |
| 4,371,433 A | 2/1983 | Balko et al. |
| 4,397,917 A | 8/1983 | Chi et al. |
| 4,938,850 A | 7/1990 | Rothschild et al. |
| 5,072,917 A | 12/1991 | Pleva |
| 5,102,499 A | 4/1992 | Jodgens et al. |
| 5,108,849 A | 4/1992 | Watkins et al. |
| 5,201,997 A | 4/1993 | Fishter et al. |
| 5,296,109 A | 3/1994 | Carlson et al. |
| 5,300,370 A * | 4/1994 | Washington et al. ........... 429/34 |
| 5,316,644 A | 5/1994 | Titterington et al. |
| 5,324,565 A | 6/1994 | Leonida et al. |
| 5,366,823 A | 11/1994 | Leonida et al. |
| 5,372,689 A | 12/1994 | Carlson et al. |
| 5,441,621 A | 8/1995 | Molter et al. |
| 5,464,524 A | 11/1995 | Ogiwara et al. |
| 5,466,354 A | 11/1995 | Leonida et al. |
| 5,565,071 A | 10/1996 | Demaray et al. |
| 5,580,672 A | 12/1996 | Zagaja, III et al. |
| 5,846,669 A | 12/1998 | Smotkin et al. |

(Continued)

OTHER PUBLICATIONS

ASTM International, Standard Specification for Electrodeposited Coatings of Tin-Lead Alloy (Solder Plate), Designation: B 579-73 (Reapproved 2004).

(Continued)

*Primary Examiner* — Dah-Wei D Yuan
*Assistant Examiner* — Stephan Essex
(74) *Attorney, Agent, or Firm* — Michaud Kinney Group LLP

(57) ABSTRACT

A fluid conduit for use in an electrochemical cell, the fluid conduit comprising a support comprising an elastically deformable material and having a plurality of apertures extending therethrough defining a mesh through which fluid communication can be maintained and a peripheral sealing area; a flow plate positioned adjacent the support, the flow plate including an inlet and an outlet; and a separator positioned adjacent the support. The support, flow plate, and separator are sealingly engaged with one another and cooperate to define a plurality of flow paths in fluid communication with and extending axially between the inlet and the outlet. The support, flow plate, and separator can be comprised of a metallic material coated with an electrically conductive joining compound for providing sealing engagement and electrically conductive communication therebetween.

23 Claims, 21 Drawing Sheets

U.S. PATENT DOCUMENTS

| | | |
|---|---|---|
| 5,856,036 A | 1/1999 | Smotkin et al. |
| 5,942,350 A | 8/1999 | Roy et al. |
| 6,037,075 A | 3/2000 | Critz et al. |
| 6,099,716 A | 8/2000 | Molter et al. |
| 6,117,287 A | 9/2000 | Molter et al. |
| 6,171,719 B1 | 1/2001 | Roy et al. |
| 6,284,402 B1 | 9/2001 | Mallouk et al. |
| 6,365,032 B1 | 4/2002 | Shiepe et al. |
| 6,372,373 B1 * | 4/2002 | Gyoten et al. .............. 429/35 |
| 6,375,812 B1 | 4/2002 | Leonida et al. |
| 6,410,179 B1 * | 6/2002 | Boyer et al. ............... 429/39 |
| 6,464,846 B1 | 10/2002 | Titterington et al. |
| 6,471,850 B2 | 10/2002 | Shiepe et al. |
| 6,500,319 B2 | 12/2002 | LaConti et al. |
| 6,585,869 B2 | 7/2003 | Shiepe et al. |
| 6,669,826 B1 | 12/2003 | Milgate, Jr. et al. |
| 6,686,084 B2 | 2/2004 | Issacci et al. |
| 6,818,347 B1 | 11/2004 | Jin et al. |
| 6,828,056 B2 | 12/2004 | Molter et al. |
| 6,833,205 B2 | 12/2004 | Speranza et al. |
| 6,852,441 B2 | 2/2005 | Milgate, Jr. et al. |
| 6,855,450 B2 | 2/2005 | Molter et al. |
| 6,866,806 B2 | 3/2005 | Andrews et al. |
| 6,913,791 B2 | 7/2005 | Burca et al. |
| 6,932,897 B2 | 8/2005 | Burca et al. |
| 7,217,472 B2 | 5/2007 | Leonida |
| 2002/0068215 A1 * | 6/2002 | Hamada et al. ............. 429/42 |
| 2003/0091877 A1 * | 5/2003 | Chen et al. ................. 429/19 |
| 2004/0209147 A1 * | 10/2004 | Finkenwirth et al. ......... 429/35 |
| 2004/0214071 A1 * | 10/2004 | Barnett et al. .............. 429/44 |
| 2005/0244699 A1 * | 11/2005 | Shimoi et al. .............. 429/34 |
| 2005/0244702 A1 * | 11/2005 | Horiguchi .................. 429/34 |
| 2006/0199054 A9 * | 9/2006 | Gallagher et al. ........... 429/26 |

OTHER PUBLICATIONS

ASTM International, Standard Specification for Electrodeposited Coatings of Tin, Designation: B 545-97 (Reapproved 2004).

* cited by examiner

FLUID CONDUIT FOR AN ELECTROCHEMICAL CELL AND METHOD OF ASSEMBLING THE SAME

This application claims priority from provisional application Ser. No. 60/717,007, filed Sep. 13, 2005, the disclosure of which is incorporated by reference in its entirety.

FIELD OF THE INVENTION

The present invention is generally directed to a fluid conduit for an electrochemical cell and a method of assembling the same; and is more specifically directed to a plurality of fluid conduits capable of operating as a plurality of electrochemical cells.

BACKGROUND OF THE INVENTION

Electrochemical systems have practical uses as sensors, fuel cells and electrolytic cells. Electrochemical cells used as fuel cells provide an environmentally clean method for generating electricity. Each cell is formed from a plurality of components connected to each other in electrically conductive communication. Fuel cell systems can be formed by stacking and electrically connecting at least two electrochemical cells together to provide power generation for residential, commercial and industrial scale power applications. As a result of assembling multiple electrochemical cells in stacks, the dimensional tolerances associated with the fabrication of cell components can accumulate thereby creating a potential for undesirable shifting of the components. The dimensions of sealing components within the electrochemical cell also vary as the temperature of the cell changes and as forces acting on the electrochemical cell change. This can lead to leakage of fuel from the electrochemical cell and reduced electrical output. In addition, when separate components are used to compensate for dimensional tolerance, the overall number of component parts in an electrochemical cell increases, thereby increasing the complexity of assembly.

Sealants including gaskets and adhesives such as dielectric adhesives have been used to join components of electrochemical cells. Sealants have a tendency to erode or degrade over time, thereby becoming less effective. Sealants are, generally placed on or applied to sealing areas of cell components leaving other portions of the components disposed within the periphery of the sealing area free of sealants. Selective use of sealants in this manner can cause a gap to form between the portions of the cell components which have no adhesive applied thereto. For example in an active area of a cell component where the electrochemical reactions occur, generally no sealant is applied. Therefore, in the cell active areas an unintended gap, approximately equal to the thickness of the sealant, can occur between adjacent cell components. Electrochemical cell designs which utilize sealants have, therefore included additional components dedicated to compensating for the dimensional offsets or gaps, thereby increasing the overall number of components and the difficulty of assembling an electrochemical cell. Moreover, use of dielectric adhesives can result in the need to provide further components to provide for electrical conductivity within the electrochemical cell. Furthermore, dielectric adhesives are limited for use in applications with low temperature operating conditions thus limiting the applications in which they can be used.

Electrochemical systems generally include two catalytic electrodes in contact with an electrolyte medium forming a generally pliable electrode-electrolyte assembly. The electrode-electrolyte assemblies can contract or expand depending on the amount of water retained therein. For pliable electrode-electrolyte assemblies, support devices for maintaining a desired shape of the electrode-electrolyte assembly are typically used within an electrochemical cell. However, because the dimensions of the electrode-electrolyte assembly vary due to variations in the amount of water retained therein and due to forces applied thereto, dimensional compensating components have been used in addition to the support device. Selection of an appropriate material for dimensional compensating components is difficult because such components must be electrically conductive and capable of elastic deformation. A porous form of graphitic carbon has been used for manufacture of dimensional compensating components. However, graphitic carbon has a relatively low tensile strength and is known to degrade in electrochemical cell applications. The prior art has not disclosed a unitary metallic component which both effectively compensates for dimensional variations of and provides support for the electrode-electrolyte assembly.

Assembly of electrochemical cells can be difficult because of the need to join many individual components together in sealing engagement while providing means for compensating for variations in the dimensions of the components during operation. Assembly of electrochemical cells is further complicated because electrical connections which are required between certain cell components are typically formed during assembly.

There is a need to provide an electrochemical cell with a reduced number of components and which perform superior to graphitic carbon materials to improve: compensation for dimensional offsets, support for electrode-electrolyte assemblies, uniformity of distribution of process fluids, manufacturability, strength, corrosion resistance, assembly reliability, sealing capability, electrical contact during operation. Prior art methods and systems for addressing these needs were either too expensive, inefficient, or ineffective or a combination of all of these. Based on the foregoing, it is the general object of the present invention to improve upon or overcome the problems and drawbacks of the prior art.

SUMMARY OF THE INVENTION

According to one aspect of the present invention, a fluid conduit for use in an electrochemical cell is provided. The fluid conduit, which provides for fluid flow to and away from an electrode structure of the electrochemical cell, includes a support, a flow plate positioned adjacent the support, and a separator positioned adjacent the flow plate. The support is comprised of an elastically deformable material in the form of a mesh having a plurality of apertures extending therethrough, through which fluid communication can be maintained. The flow plate is positioned adjacent the support and includes an inlet and an outlet. The support, the flow plate, and the separator are sealingly engaged with one another and cooperate to define a plurality of flow paths in fluid communication with and extending axially between the inlet and the outlet.

In another aspect of the present invention, a fluid conduit for use in an electrochemical cell includes a support comprising a metallic material and a flow plate comprising a metallic material, positioned adjacent to the support. The flow plate includes an inlet and an outlet. The fluid conduit further includes a separator, comprising a metallic material, positioned adjacent to the flow plate. At least a portion of the support, the separator and the flow plate are coated with a uniform thickness of an electrically conductive joining compound for sealingly engaging the support, the separator and the flow plate in electrically conductive communication with one another. The support, the separator and the flow plate cooperating to define a plurality of flow paths in fluid communication with and extending axially between the inlet and the outlet.

In another aspect of the present invention, a fluid conduit for use in an electrochemical cell includes a support comprising an elastically deformable material, the support having a plurality of apertures extending therethrough defining a mesh through which fluid communication can be maintained, and a peripheral sealing area. A separator, positioned on the support, has an inlet and an outlet. The support and the separator are sealingly engaged with one another and cooperate to define a plurality of flow paths in fluid communication with and extending axially between the inlet and the outlet. The separator includes a plurality of walls axially extending between the inlet and the outlet. The walls are substantially parallel to one another and positioned on the separator such that, when the separator is flipped 180 degrees about an axis extending along one of the walls and the flow plate is positioned on and aligned with another of the separators, at least one of the walls of the separator is positioned between the walls of the other separator. The support and the separator are in electrically conductive communication with one another.

In yet another aspect of the present invention, an electrochemical cell includes a first support and a second support each comprising an elastically deformable material and defining a centrally positioned mesh area bounded by a peripheral sealing area; a first separator and a second separator; a first flow plate positioned between the first support and the first separator; a second flow plate positioned between the second support and the second separator, wherein each of the first and second flow plates defines an inlet and an outlet; and an electrode-electrolyte assembly comprising an electrolyte membrane, preferably formed from a polymer, a first electrode positioned on the polymer electrolyte membrane, and a second electrode positioned on an opposing surface of the polymer electrolyte membrane. The first electrode is in fluid communication with the first support and said second electrode is in fluid communication with the second support. The first support, the first flow plate, and the first separator cooperate to define a first plurality of flow paths in fluid communication with and extending axially between the inlet and the outlet of the first flow plate, and wherein the second support, the second flow plate, and the second separator cooperate to define a second plurality of flow paths in fluid communication with and extending axially between the inlet and the outlet of said second flow plate.

Another embodiment of the present invention involves a method of assembling the fluid conduits wherein at least a portion of the separator, the support and the flow plates are coated with a joining compound. The flow plate is then positioned between a support and a separator and together they are heated to activate the joining compound. Upon cooling, the joining compound cures thereby joining the separator, flow plate and support together.

In operation, a first process fluid is caused to flow through a first plurality of flow paths and a second process fluid is caused to flow through a second plurality of flow paths thereby causing an electrochemical reaction and a flow of electrical current.

DETAILED DESCRIPTION OF THE PREFERRED EMBODIMENT

Figure 1:
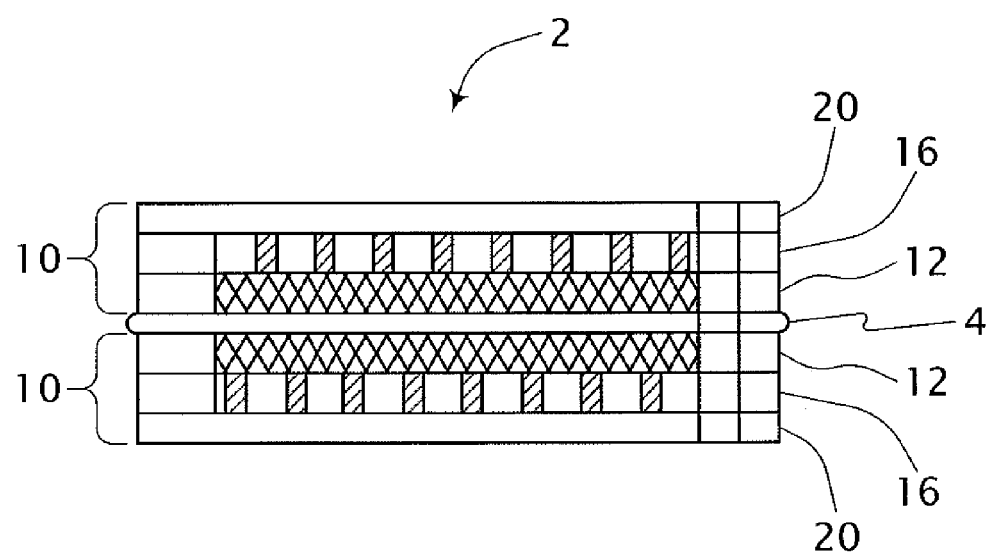
FIG. 1 is a schematic view of an electrochemical cell.

Referring to FIG. 1, an electrochemical cell is shown generally at 2 and is hereinafter referred to as "cell 2." The cell 2 includes an electrode/electrolyte assembly 4 supported between adjacent fluid conduits 10. Each fluid conduit 10 of the present invention includes a support 12, a flow plate 16, and a separator 20 sealingly engaged with one another and arranged together in fluid and electrical communication. The support 12, the flow plate 16, and the separator 20 cooperate to define a plurality of axially extending flow paths. Several cells may be connected individually together in an electrical series circuit or arranged in a stack with suitable fluid distribution hardware. When several cells are arranged together in a stack, the stack can be mono-polar or bi-polar. In bi-polar stacks one separator plate is positioned between adjacent fluid conduits. In mono-polar stack assemblies, separators are replaced with dielectric cover plates.

Figure 2:
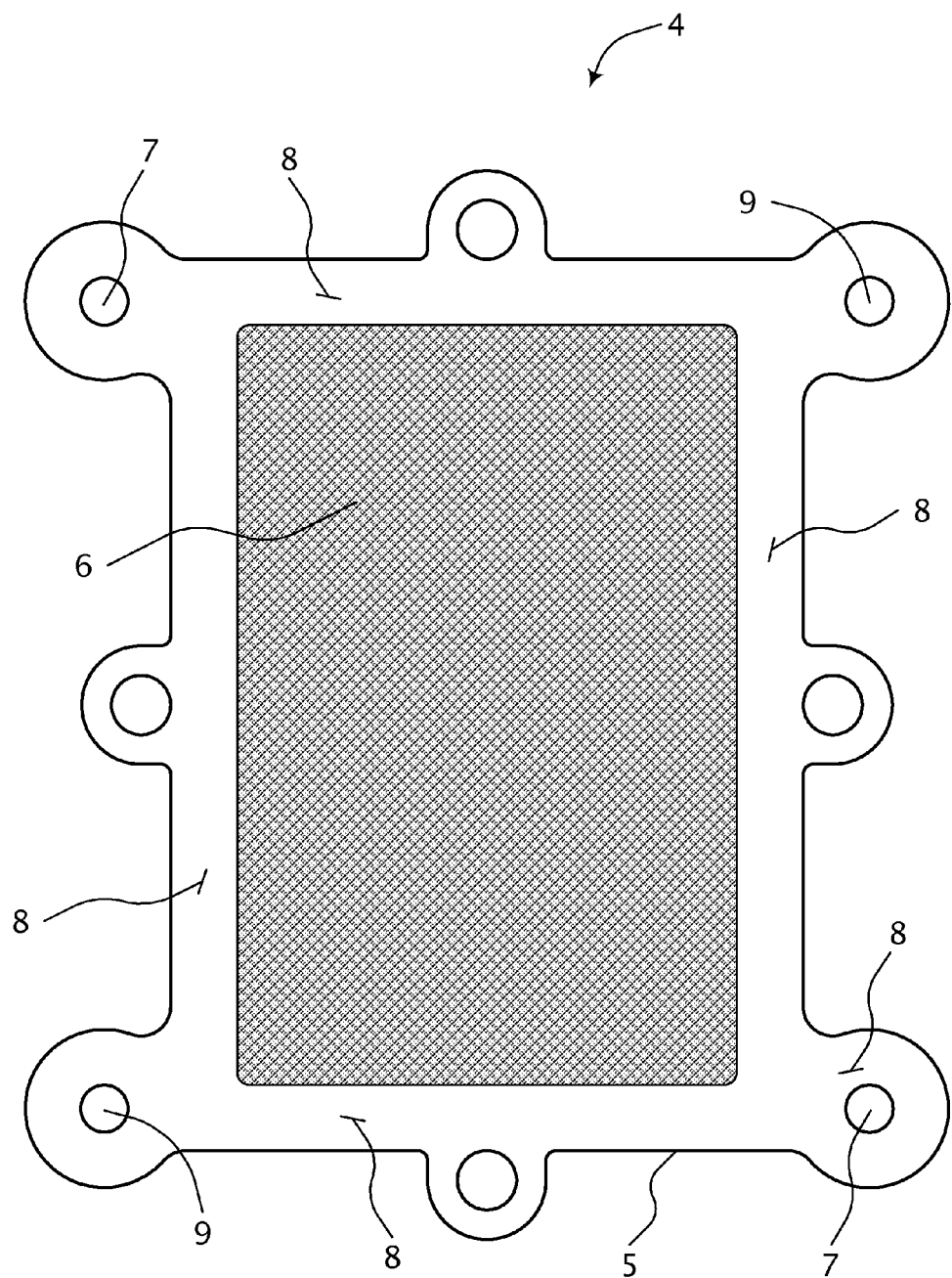
FIG. 2 is a top view of an electrode-electrolyte assembly.

Referring to FIG. 2, the electrode/electrolyte assembly 4 includes an electrolyte membrane 5, preferably formed of an ion exchanging polymer, the electrolyte having electrodes 6, preferably catalytic electrodes hot-pressed onto opposing surfaces thereof. The polymer electrolyte membrane 5 is generally a soft compliant material, comprising any ion-conductive material and is generally a hydrocarbon resin or a fluorocarbon resin capable of facilitating ion transfer in two directions. For hydrocarbon resins, phenolic-based materials are of particular use. Fluorocarbon resins are particularly useful for providing resistance in chemically corrosive environments. Suitable materials from which the electrodes can be fabricated include, but are not limited to, platinum, palladium, rhodium, gold, tungsten, tantalum, ruthenium, and alloys and combinations of the foregoing. The present invention is not limited in this regard, and other membrane materials and electrode materials are within the scope of the invention.

The electrode/electrolyte assembly 4 also includes through holes 7, 9 and a sealing area 8. When the cell is assembled, the sealing area 8 engages with a sealing area of the support 12, and the electrodes 6 are in electrically conductive communication with an active area of the support. When the cell is assembled, the through holes 7, 9 define manifolds that provide fluid communication through the fluid conduit 2.

Figure 3:
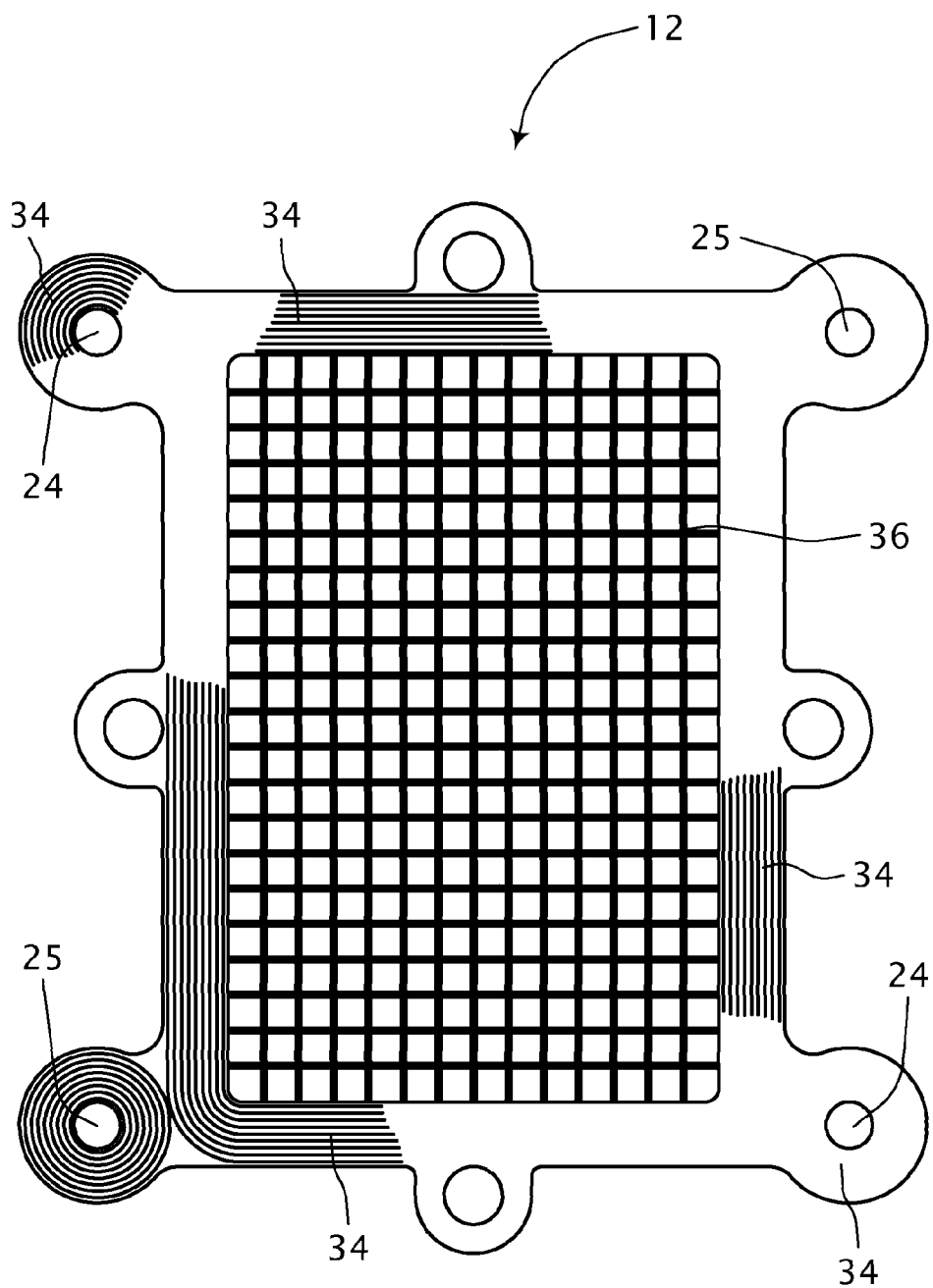
FIG. 3 is a top view of one embodiment of a support, of the present invention, for an electrochemical cell.

Referring to FIG. 3, the support 12 comprises an elastically deformable material in the form of a mesh having openings sized such that when the mesh is positioned against the electrode-electrolyte assembly, the electrode-electrolyte assembly 4 is supported against the stresses generated by the weight of the electrode-electrolyte assembly and the differential pressure across the assembly experienced during operation of the cell. The support 12 also compensates for variations in the dimensions of the electrode-electrolyte assembly 4 in an active area defined by the electrodes 6 caused by changes in water content therein. The support 12 has a first active area 36 located within the periphery. The first active area 36 is defined by the mesh, through which fluid communication can be maintained between the adjacently positioned flow plate and electrode/electrolyte assembly 4.

Figure 4:
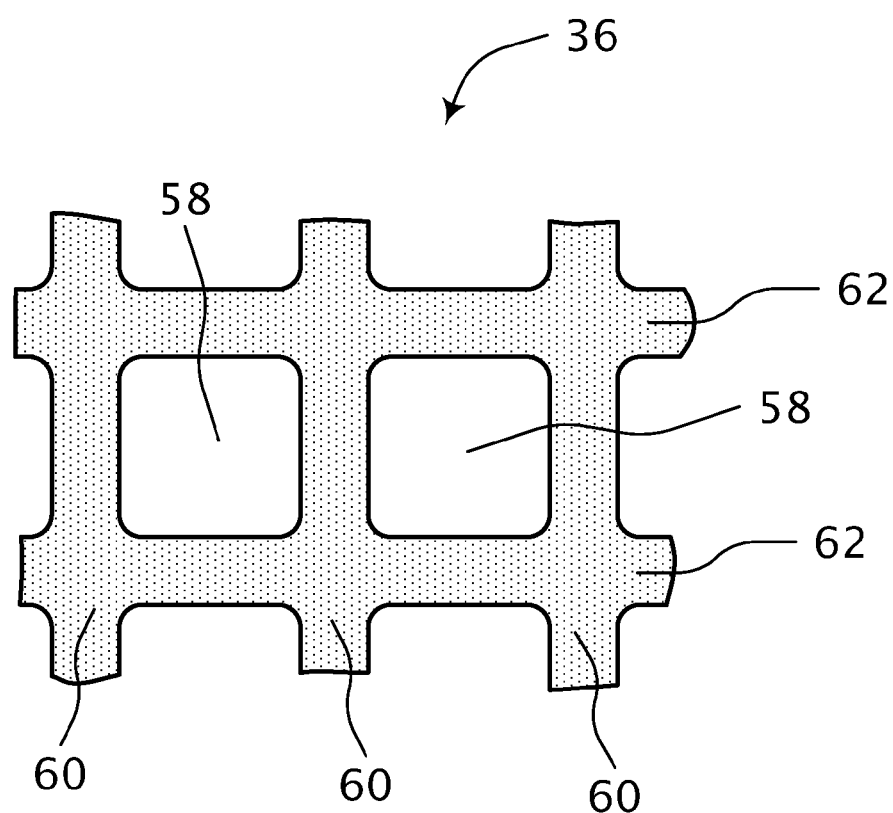
FIG. 4 is a top view of the mesh configuration of the support of FIG. 3.

Referring to FIG. 4, the first active area 36 of the support 12 has a plurality of apertures 58 defined by axially extending ribs 60 and transversely extending ribs 62. The axially extending ribs 60 and the transversely extending ribs 62 comprise a resilient material that enables elastic deformation of the first active area 36 of the support 12.

Figure 7:
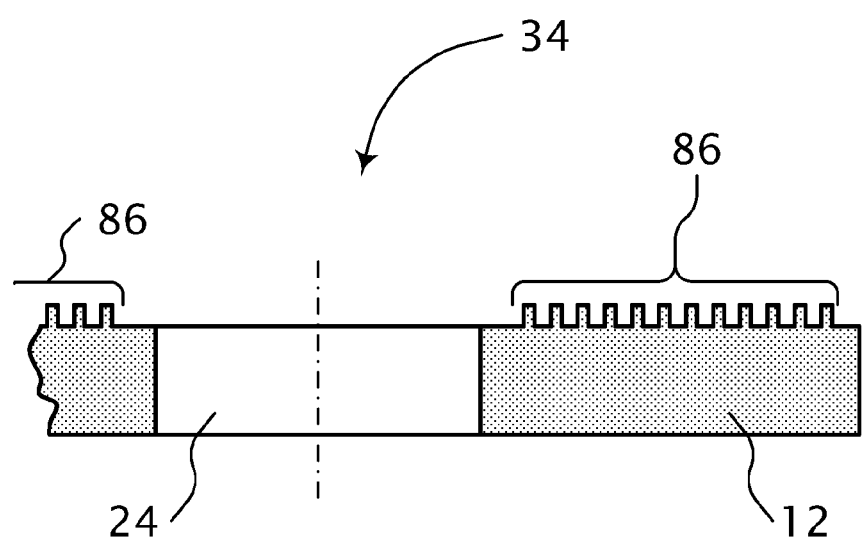
FIG. 7 is a cross sectional view of a sealing area of a support.

Referring back to FIG. 3, the support 12 has a first sealing area 34 substantially along the periphery thereof and substantially coincident with a frame. The first sealing area 34 of one side of the support is an interference pattern (e.g., grooves) that forms a positive interlocking seal with the soft polymer material of the electrode/electrolyte assembly. The interference pattern 86, as illustrated in FIG. 7, includes a plurality of parallel ridges that form grooves. When the support 12 is positioned adjacent to the electrode/electrolyte assembly, the ridges of the first sealing area 34 are pressed onto the material of the electrode/electrolyte assembly and can deform to prevent fluid communication across the ridges.

The support 12 also includes through holes 24, 25. When the support 12 is assembled with other componentry, the through holes 24, 25 define manifolds that provide fluid communication through the fluid conduit 2. The first sealing area 34 also extends substantially around the through holes 24, 25.

Figure 5:
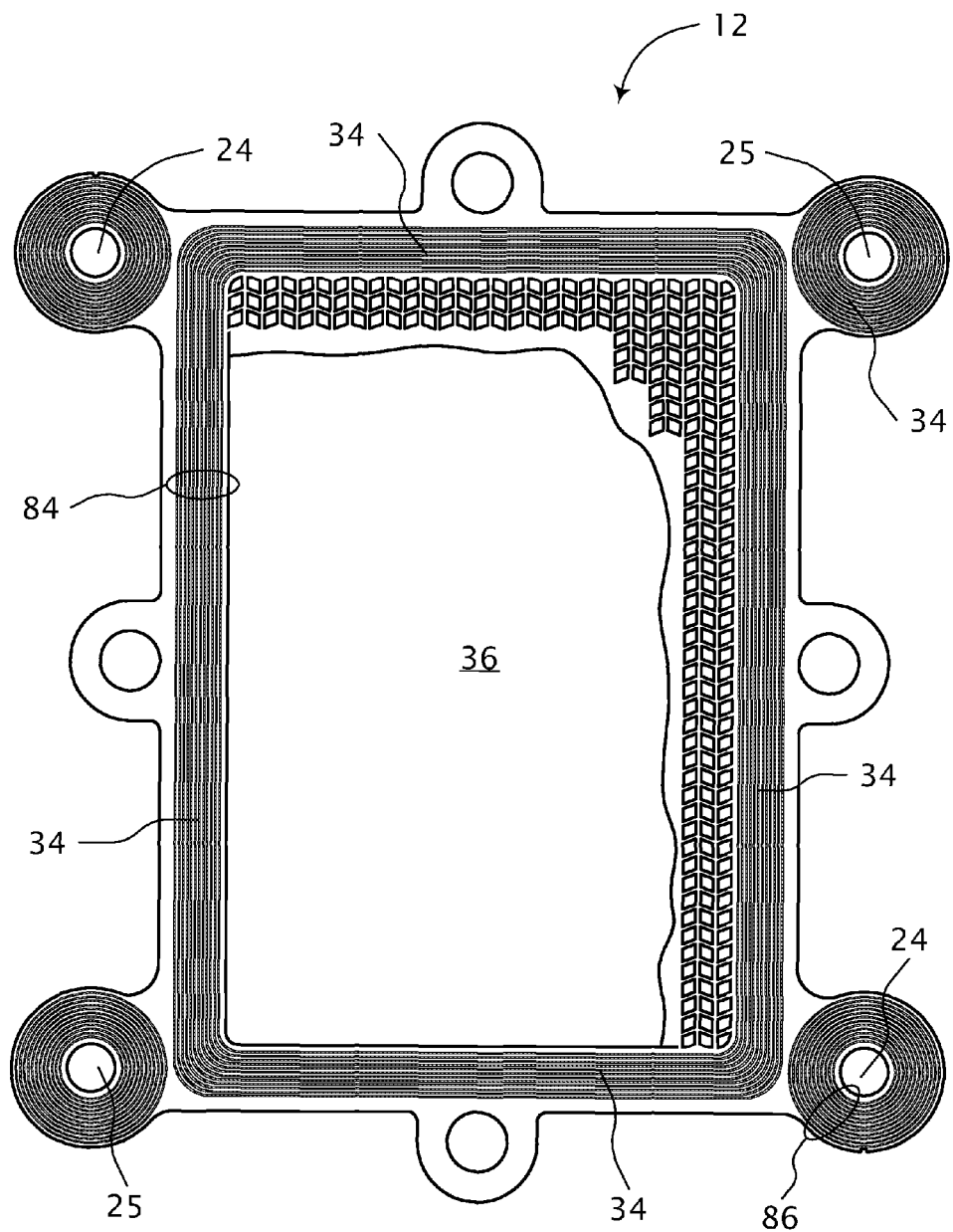
FIG. 5 is a top view of another embodiment of a support, of the present invention, for an electrochemical cell.
Figure 6:
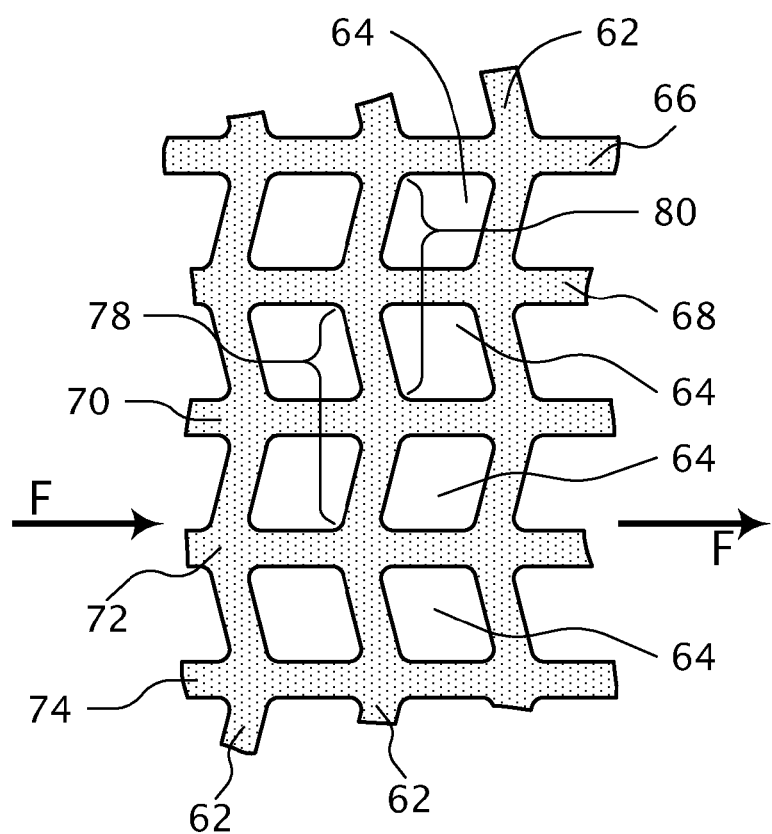
FIG. 6 is a top view of the mesh configuration of the support of FIG. 5.

Referring now to FIGS. 5 and 6, the first active area 36 is preferably defined by a mesh having strands that are obliquely-oriented so as to facilitate the transfer of fluids through the mesh. More particularly, the mesh comprises polygon shaped apertures 64 defined by transversely extending ribs 62 and a plurality of axially extending ribs 66, 68, 70, 72 and 74, wherein each of the axially extending ribs are substantially parallel to one another. The oblique structure of the ribs facilitates moisture removal from a process fluid flowing adjacent the support 12 in the general direction F. In particular, when at least some of the axially extending ribs 66, 68, 70, 72 and 74 are aligned with a corresponding wall in the flow plate, the transversely extending ribs 62 define a concave side 78 and a convex side 80, the concave sides 78 being positioned facing the inlet to retain process fluid flowing through the flow paths in the general direction F. In addition, the plurality of axially extending ribs 66, 68, 70, 72, and 74 and the plurality of transversely extending ribs 62 comprise a resilient material enabling elastic deformation of the first active area 36 of the support 12.

In any embodiment of the support 12, the apertures comprise about between 30 and 70 percent of the mesh, with about 55 percent being preferred. In addition, each of the apertures comprises an area from about 0.0001 square inches to about 0.01 square inches, with about 0.007 square inches being preferred.

Figure 8A:
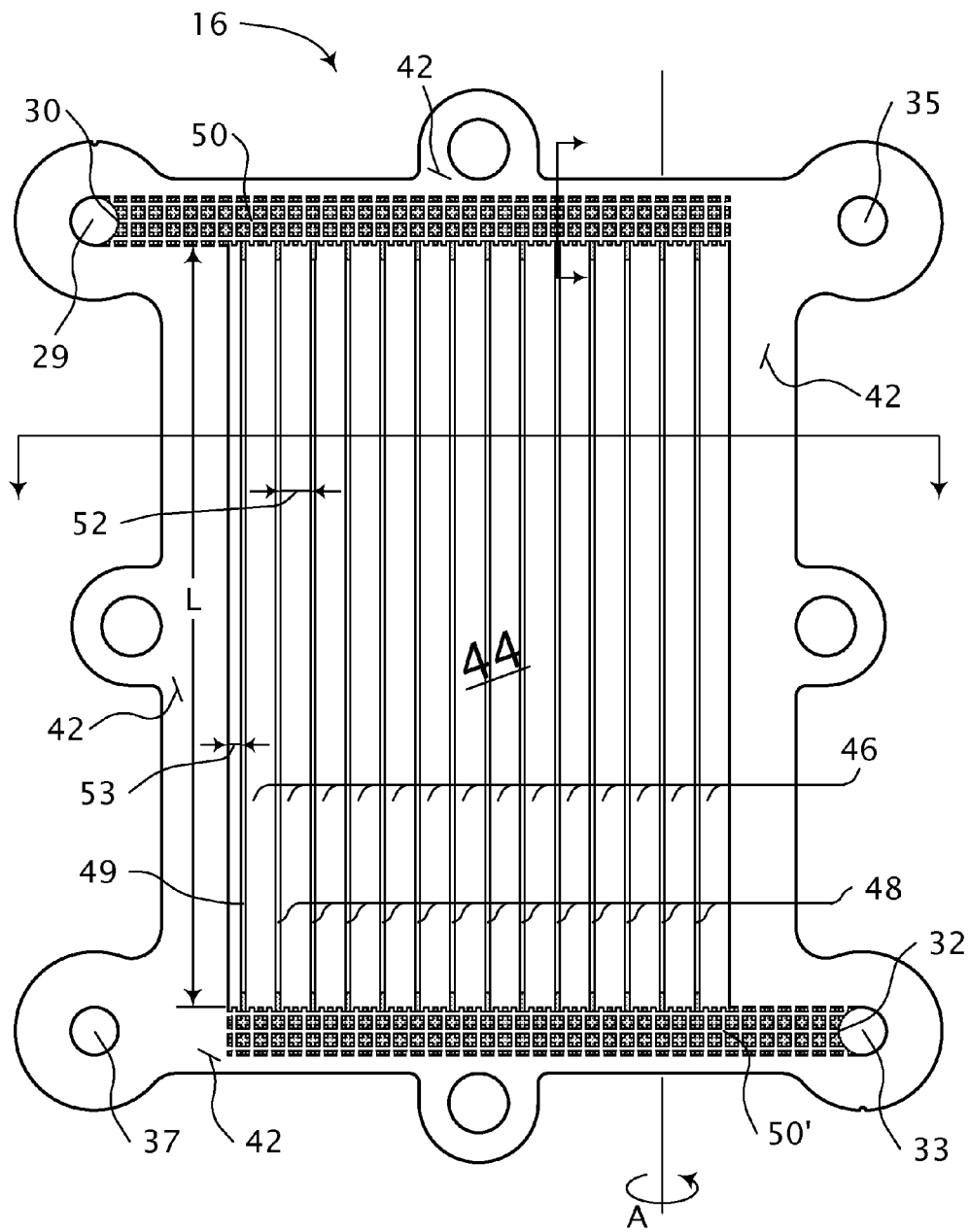
FIG. 8A is a top view of a flow plate for the fluid conduit for an electrochemical cell.
Figure 8B:
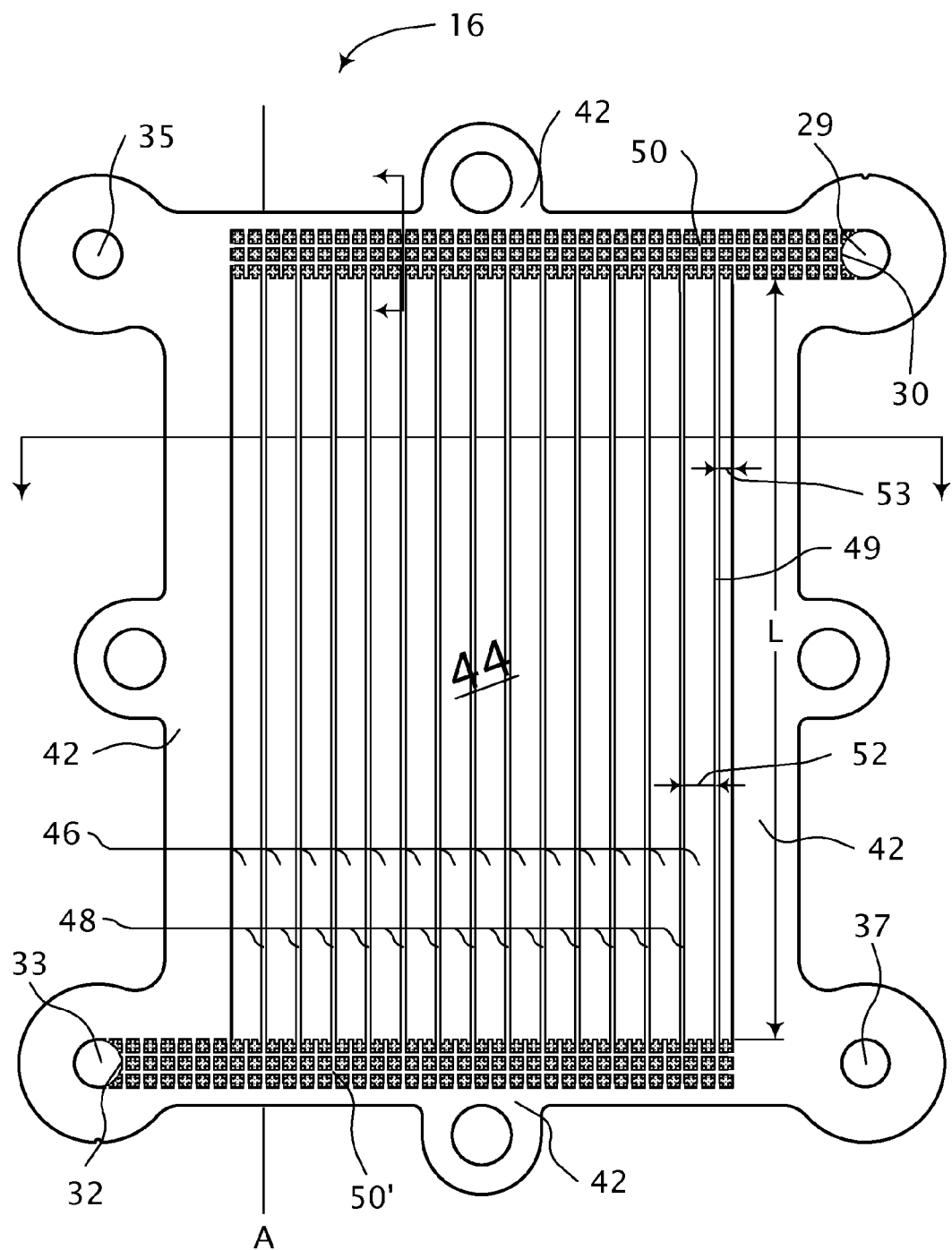
FIG. 8B is a bottom view of the flow plate of FIG. 8A.
Figure 9:
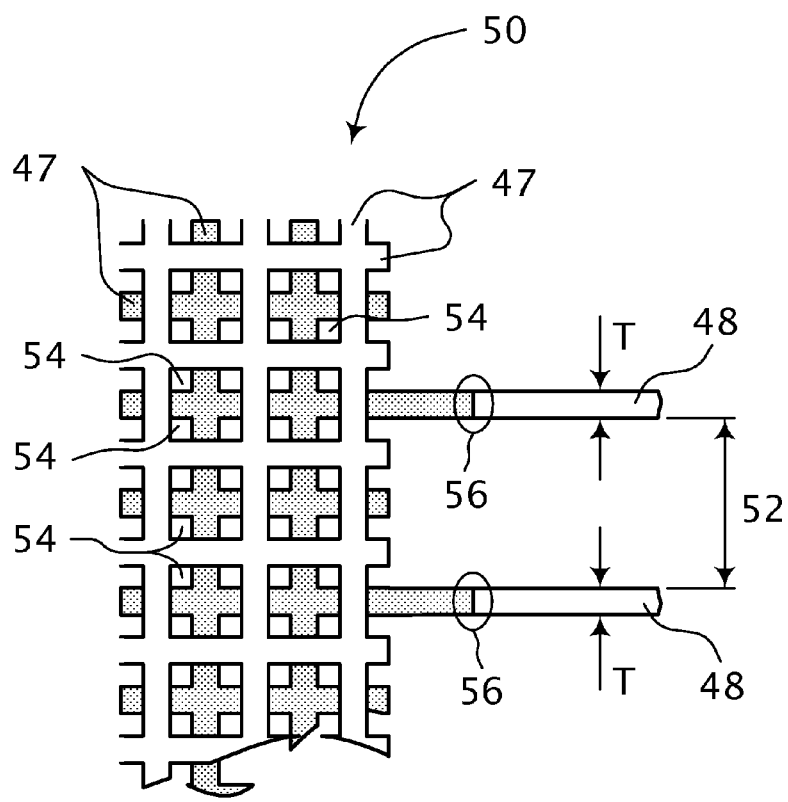
FIG. 9 is a top view of a flow distribution means of a flow plate of the present invention.
Figure 10:
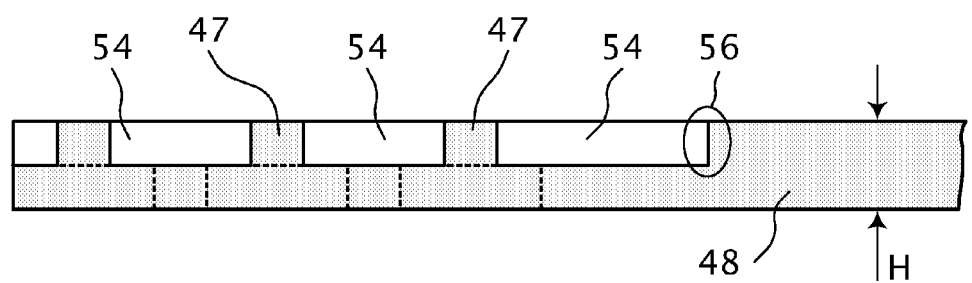
FIG. 10 is a side view of the flow distribution means, of the present invention, of FIG. 9.

Referring now to FIGS. 8A and 8B, the flow plate 16 includes an inlet through hole 29 that defines part of an inlet manifold of the cell, a flow distribution inlet 30, a flow distribution structure 50, a flow plate active area 44, a flow distribution receiving structure 52, a flow distribution outlet 32 that defines part of the outlet manifold of the cell, and an outlet through hole 33. A flow plate sealing area 42 extends substantially about the periphery of the flow plate 16. The flow distribution inlet 30 is in fluid communication with the inlet through hole 29 and provides process fluid to the flow distribution structure 50. The flow distribution structure 50 distributes the process fluid to the flow plate active area 44 via the flow paths 46 axially extending between the flow distribution inlet 30 and the flow distribution outlet 32, which allow the fluid to be dispensed through the support substantially uniformly over the surface area of the electrode/electrolyte assembly when the flow plate 16 is mounted adjacent the support. Excess fluid in the flow paths 46 is received in the flow distribution receiving structure 52, which channels the process fluid to the flow distribution outlet 32 and to the outlet through hole 33 that defines part of the outlet manifold of the cell.

Referring now to FIGS. 8A, 8B-10, passages 54 are disposed in the flow distribution structure 50. The passages 54 in this illustration are defined by a pattern of baffle-forming walls 47 extending from the flow plate such that fluid flow is permitted in all directions within the flow distribution structure 50. The pattern of baffle forming walls 47 can be obtained, for example, by etching such that the baffle-forming walls are offset. Although the passages 54 shown are of similar size, the present invention is not limited in this regard as the passages may have different sizes and geometries. While the baffle forming walls 47 are illustrated extending from the flow plate, the present invention is not limited in this regard, as the baffle forming walls may be formed by stacking grids.

At least some of the baffle-forming walls 47 extend from the flow distribution structure 50 to the flow distribution receiving structure 52 to define walls 48 of the flow paths 46, each flow path being capable of channeling the process fluid in one direction through the electrochemical cell. In addition, at least one of the axially extending ribs 60, 66, 68, 70, 72, 74 is substantially aligned along a continuous length of one of the walls 48 and at least one of the axially extending ribs is substantially aligned between two of the walls 48. In this manner each axially extending rib 66, 70, 74 is aligned along and engaged with a continuous length of one of the walls 48 and every other axially extending rib 68, 72 is aligned between two walls. The transversely extending ribs 62 elastically deform into a gap between adjacent walls 48 in response to forces acting on the mesh and in response to expansion of the electrode. The walls 48 include relief areas in the form of reduced heights at each end, namely, proximate the junctions of the walls with the flow distribution structure and the flow distribution receiving structure. While a stepped reduction in cross section 56 is shown in the relief area, the present invention is not limited in this regard as the reduction in cross section can be gradual. The relief provides an area for ends of the electrode to expand into thereby reducing stresses acting on the electrode.

As further illustrated in FIG. 8A-B, the walls 48 are substantially parallel to one another and positioned on the flow plate 16 such that, when the flow plate is flipped 180 degrees about an axis (A) extending along one of the walls as shown in FIG. 8B, and the flow plate is positioned on and aligned with another of the flow plates, at least one of the walls of the flow plate is positioned between the walls of the other flow plate. In particular, the walls 48 are approximately equally spaced apart one from the other by a gap 52 defining a spacing between adjacent walls. A first wall 49 adjacent one side of the flow plate sealing area 42 is spaced apart from said flow plate sealing area by a second gap 53. The gap 53 is smaller than the gap 52, thereby creating an asymmetrical positioning of the walls 48 on the flow plate 16. This asymmetric positioning permits at least one wall of one of the flow plates to be positioned between the walls of another flow plate aligned therewith thus creating an area for the support to elastically deform into once the electrochemical cell is assembled. In addition, the inlet through hole 29; and the outlet through hole 33 are asymmetrically positioned on the flow plate 16 such that when the flow plate is flipped 180 degrees about the axis (A), the inlet through hole 29 and the outlet through hole 33 align with another inlet manifold and outlet manifold, respectively, on an opposing side of the cell.

Each of the walls 48 has a thickness T of about 0.005 to about 0.1 inches. The gap 52 between adjacent walls is about 0.05 to about 0.5 inches. The second gap 53 is approximately 0.025 to about 0.25 inches. In addition, each of the walls 48 has a height H of about 0.005 to about 0.1 inches, and a length L of about one inch to about ten inches. Although the walls 48 are shown substantially equally spaced from and parallel to one another, the present invention is not limited in this regard as other configurations are also possible, including but not limited to unequal spacing between the walls for providing constant velocity of the process fluid flowing through the flow paths 46.

Figure 11:
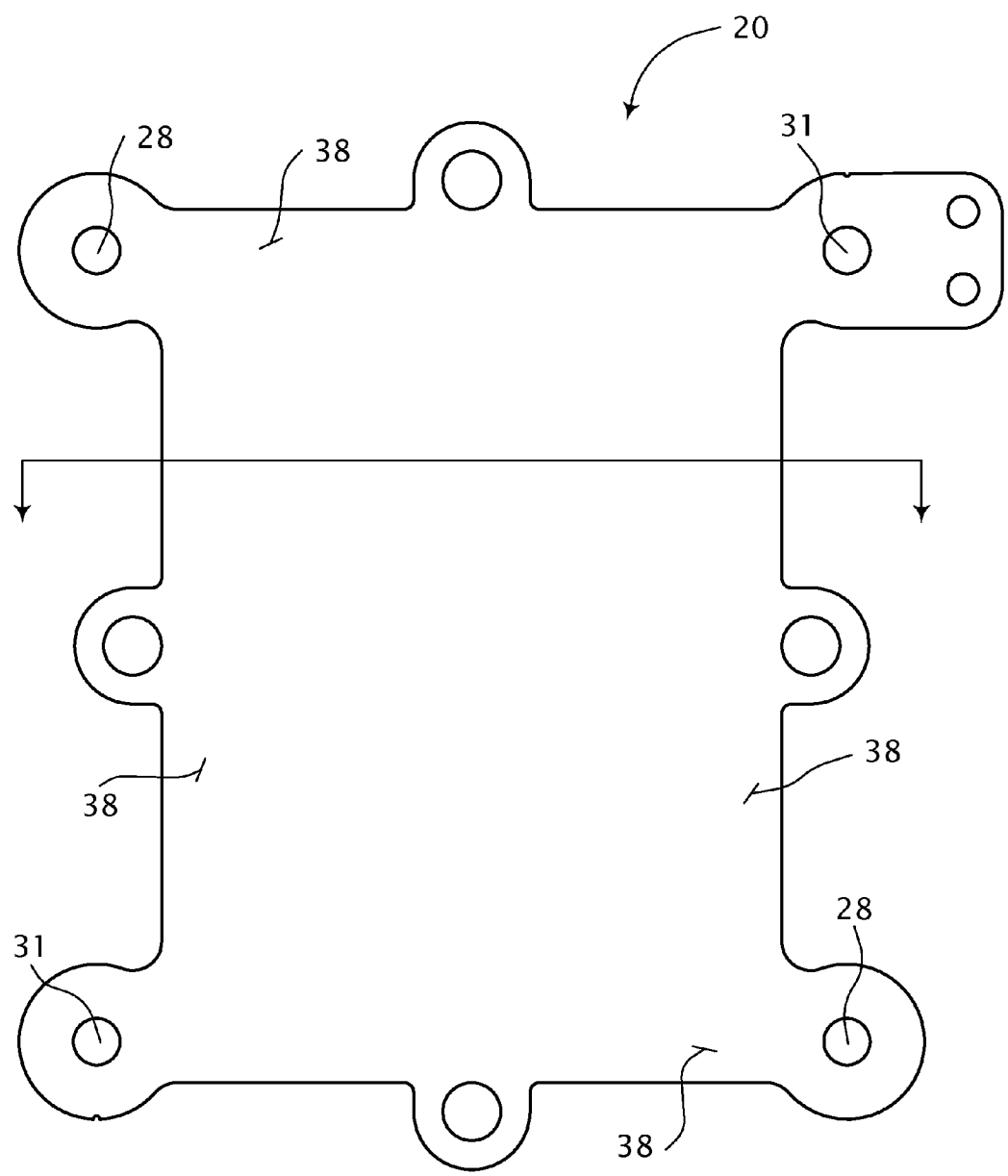
FIG. 11 is a top view of a separator.

Referring now to FIG. 11, the separator 20 is a solid planar member of substantially uniform thickness and fabricated of an electrically conductive material. The separator 20 includes through holes 28, 31 that define part of the manifolds of the cell. The area of the separator 20 along the periphery provides a separator sealing area 38.

Figure 12:
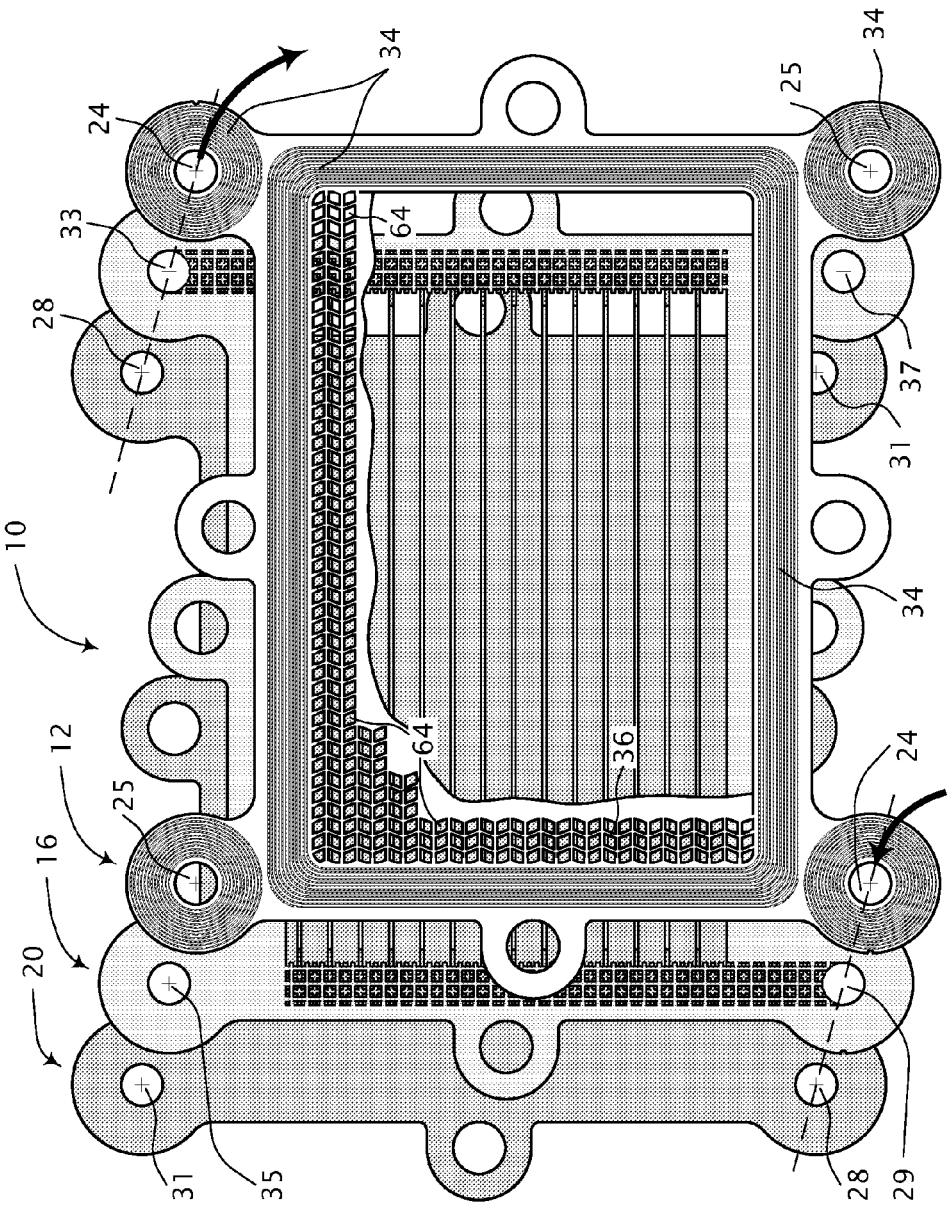
FIG. 12 is an exploded top view of the separator, support, and flow plate.

Referring now to FIG. 12, the fluid conduit 10 is assembled by stacking the support 12, the flow plate 16, and the separator 20. The through holes on the support, the flow plate, and the separator each align to form the manifolds, through which process fluid is delivered and excess process fluid is removed. The first active area 36 and the flow plate active area 44 also align such that when the process fluid is delivered through the flow distribution inlet 30 and the flow distribution structure 50, the process fluid can be readily transferred to the electrode/electrolyte assembly.

Figure 13:
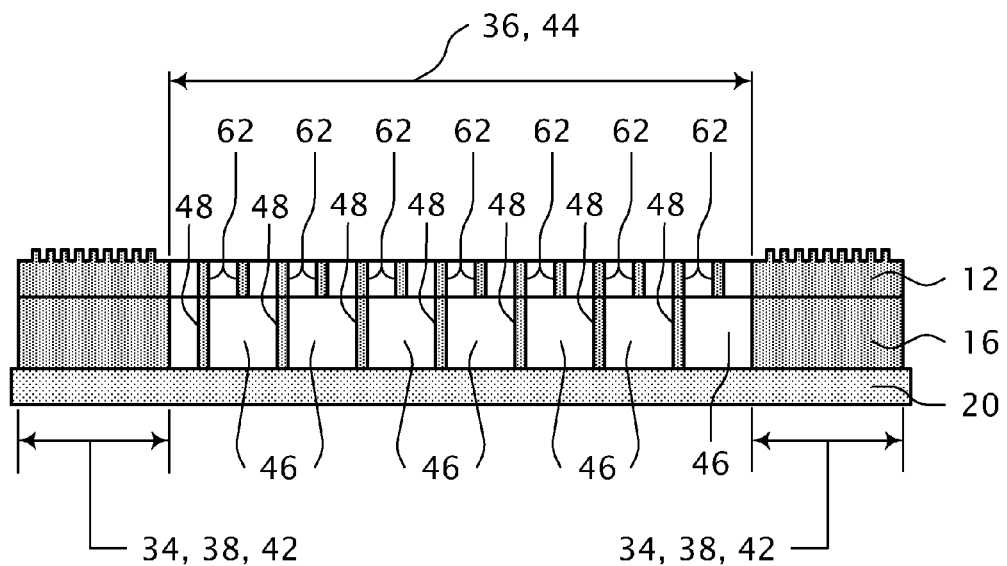
FIG. 13 is a cross sectional view of the assembled separator, support, and flow plate.

Referring now to FIG. 13, the support 12, the flow plate 16, and the separator 20 are stacked such that the first sealing areas 34, separator sealing areas 38, and flow plate sealing areas 42 are aligned and such that the first active area 36 and the flow plate active area 44 are also aligned. When assembled, the first active area 36 and the flow plate active area 44 cooperate to define a plurality of flow paths 46.

Figure 14:
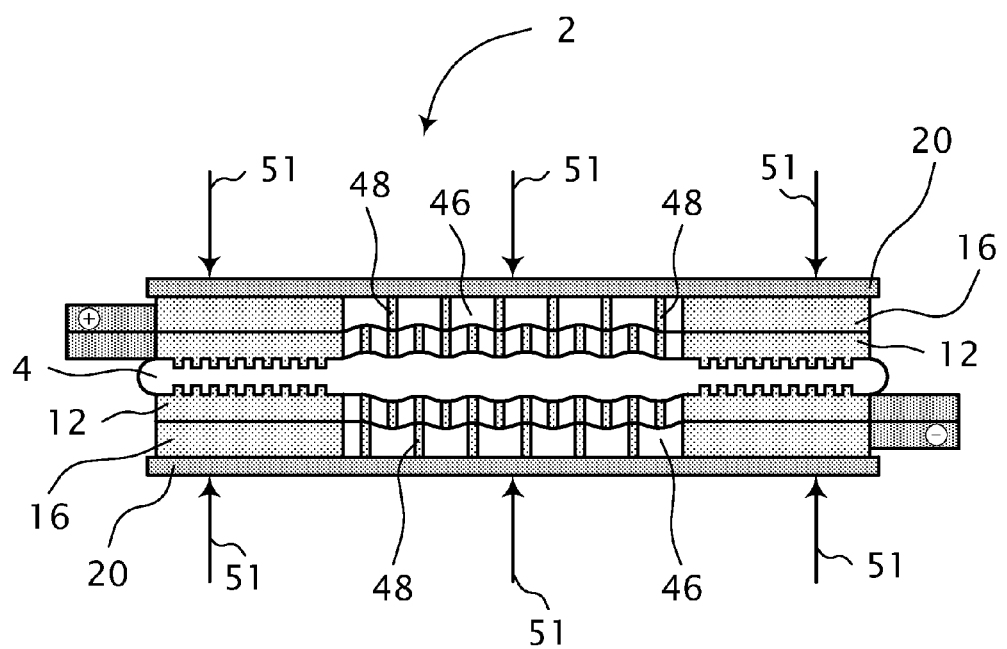
FIG. 14 is a schematic view of an electrode-electrolyte assembly and adjacent supports being deformed.

Referring now to FIG. 14, the electrode/electrolyte assembly 4 becomes slightly thinner in the sealing areas during use due to water loss and/or high loading (shown by arrows 51) of the cell 2. Thus, the active area of the electrode/electrolyte assembly 4 is displaced relative to the sealing areas. Displacement may also occur during assembly of the cell 2. The elastic deformation of the support 12 accommodates this displacement. In addition, the walls 48 of oppositingly-positioned flow plates 16 are offset such that each of the walls of one flow plate 16 are positioned substantially parallel to and between the walls of the other flow plate, thereby allowing the support 12 to deform and compensate for variations of the dimensions of the electrode/electrolyte assembly 4.

In another embodiment, the support 12, flow plate 16 and separator 20 are comprised of a least one metallic material having suitable elasticity, corrosion resistance, strength, electrical conductivity and compatibility with metallic coatings. Suitable metallic materials include titanium, aluminum, magnesium, titanium alloys and stainless steel. In another embodiment of the present invention, the support 12, flow plate 16 and separator 20 are comprised of ceramic materials.

Figure 15:
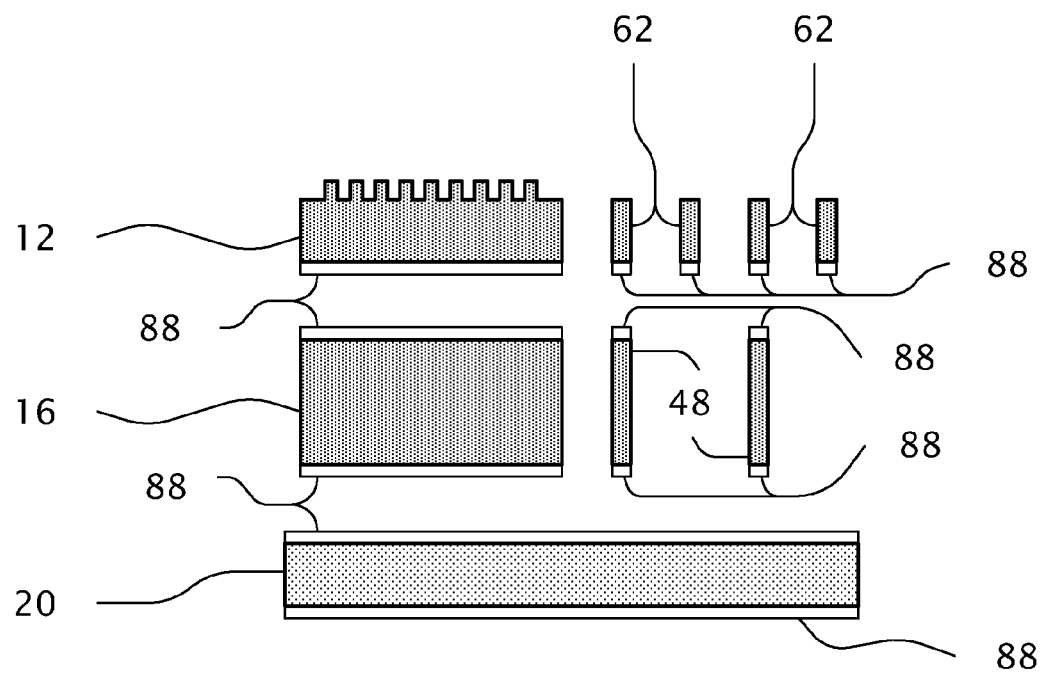
FIG. 15 is an exploded cross sectional view of the separator, support, and flow plate with joining compound.
Figure 16:
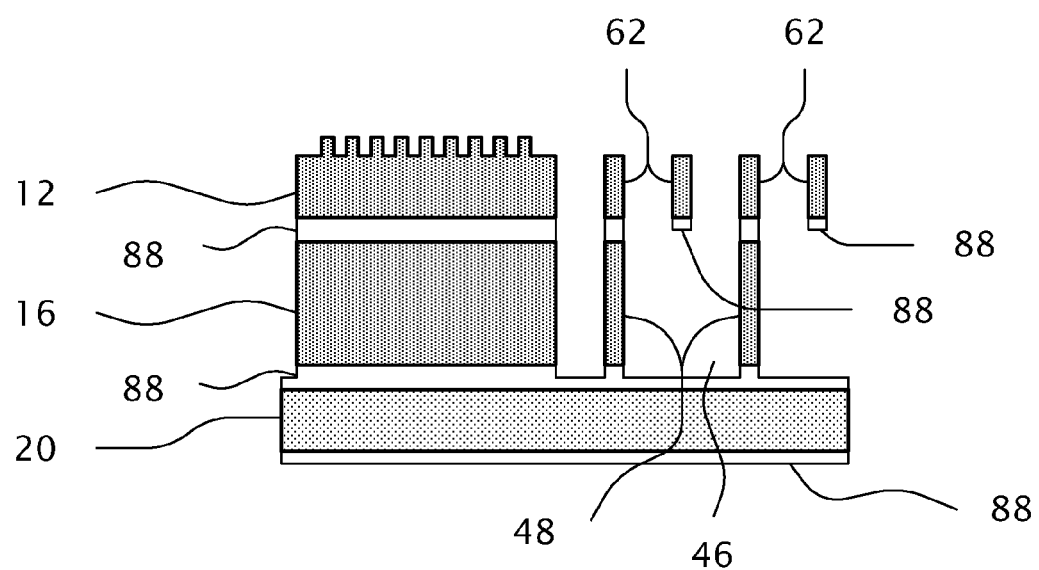
FIG. 16 is a cross sectional view of the separator, support, and flow plate joined together by the joining compound.

Referring now to FIGS. 15 and 16, at least a portion of the support 12, the flow plate 16, and the separator 20 are coated with a uniform thickness of a joining compound 88, for example an electrically conductive joining compound, for joining the support 12, the flow plate 16, and the separator 20 in electrically conductive communication and providing sealing engagement therebetween. Preferably, the joining compound 88 is applied over the entire surface of the support 12, flow plate 16 and the separator 20. In addition the coating is preferably comprised of one or more compounds having a lower melting point than and being compatible with the support 12, flow plate 16 and the separator 20. Suitable coatings include aluminum, indium, tin, gold, copper and silver and alloys thereof which can be applied by diffusion, electroless plating, electroplating, plasma spray or other suitable processes. Once coated and assembled, as shown in FIG. 16, the joining compound 88 bonds the support 12, the flow plate 16, and the separator 20, including bonding of the respective sealing areas 34, 38, 42 and active areas thereof and causing electrically conductive communication therebetween. The joining compound 88 comprises deposits in thickness between about 10 micro inches and about 500 micro inches. As such, obstruction of the flow path 46, the apertures 58, 64, and other function areas are minimized. However, any excess joining compound 88 on an exposed edge or surface may or may not be removed.

Figure 17:
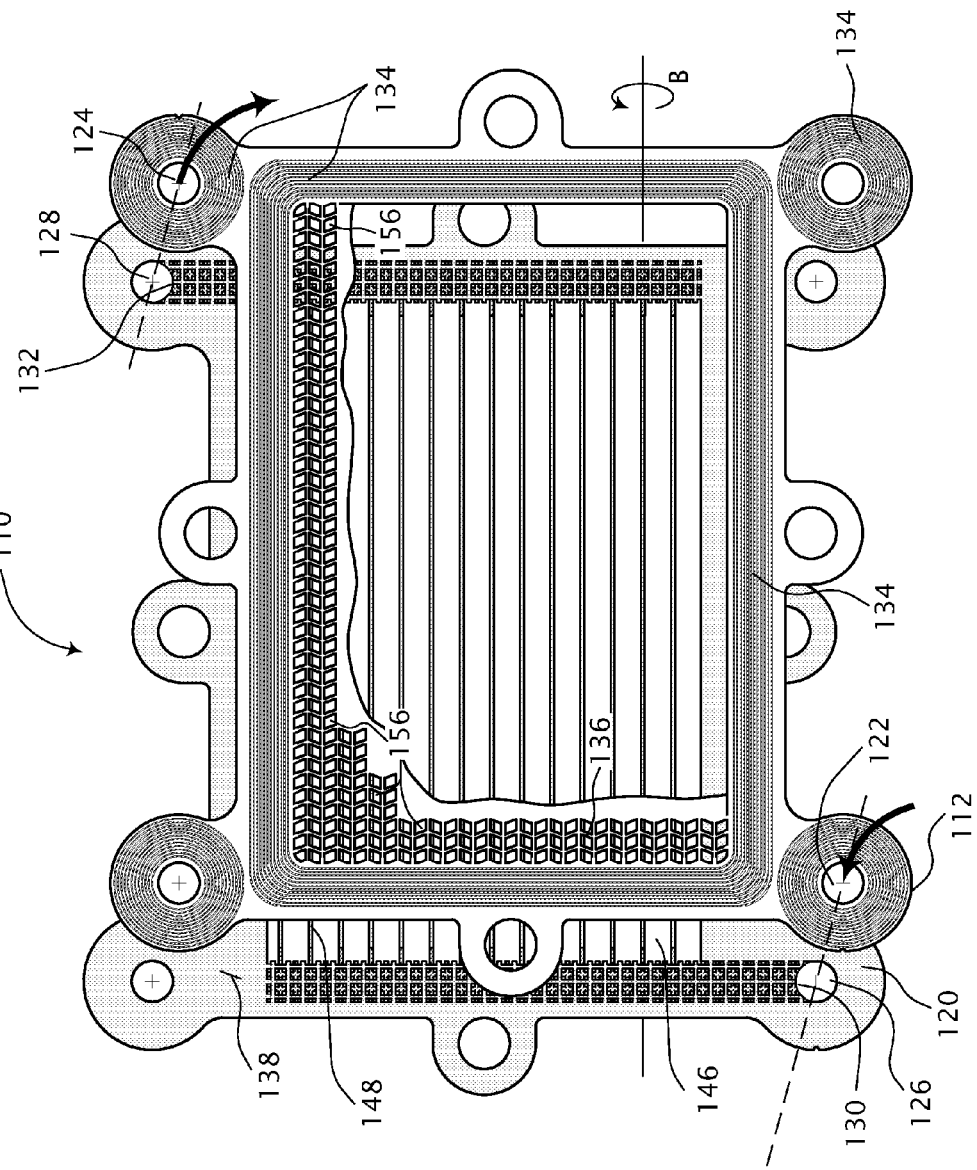
FIG. 17 is an exploded top view of a support and an integral flow plate/separator, of the present invention.
Figure 18:
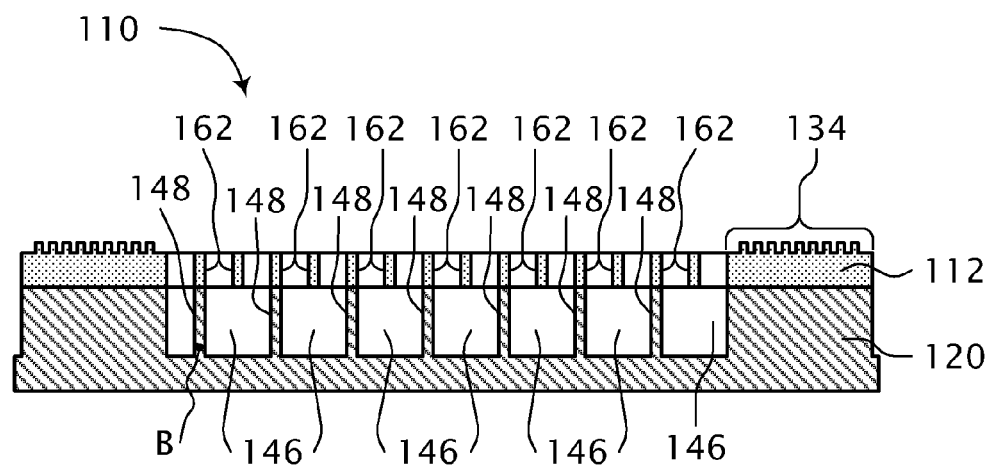
FIG. 18 is a cross sectional view of a fluid conduit illustrating a separator, of the present invention, with a plurality of axially extending walls projecting from one side thereof.

Referring now to FIGS. 17 and 18, a fluid conduit 110 includes a support 112 comprising an elastically deformable material. The support has a plurality of apertures 156 extending therethrough defining a mesh through which fluid communication can be maintained, and a peripheral sealing area 134. The fluid conduit 110 includes a separator 120, positioned on the support 112, and having a flow distribution inlet 130 and a flow distribution outlet 132. The support 112 and the separator 120 are sealingly engaged with one another and cooperate to define a plurality of flow paths 146 in fluid communication with and extending axially between the flow distribution inlet 130 and the flow distribution outlet 132. The separator 120 includes a plurality of walls 148 axially extending between the flow distribution inlet 130 and the flow distribution outlet 132.

The walls 148 defining flow paths 146 through which the process fluid may be distributed to the electrode/electrolyte assembly may be cast, cut, etched, or otherwise formed directly into the separator 120. In such an embodiment, at least some ribs 162 of the support 112 are supported by the walls 148. The support 112 and the separator 120 are coated with a joining compound to provide sealing engagement and electrically conductive communication therebetween, as described above for previous embodiments.

As similarly described above, the walls 148 are substantially parallel to one another and positioned on the separator 120 such that, when the separator is flipped 180 degrees about an axis (B) extending along one of the walls and the separator is positioned on and aligned with another of the separators, at least one of the walls of the separator is positioned between the walls of the other separator.

As similarly described in previous embodiments, a sealing area 134 is disposed on the support 112 to facilitate the sealing engagement of the support to the electrode/electrolyte assembly. The sealing area 134 is an interference pattern (e.g., grooves) that forms a positive interlocking seal with the soft polymer material of the electrode/electrolyte assembly. The interference pattern includes a plurality of parallel ridges that form grooves. When the support 112 is positioned adjacent to the electrode/electrolyte assembly, the ridges are pressed onto the material of the electrode/electrolyte assembly and can deform to prevent fluid communication across the ridges.

Figure 19:
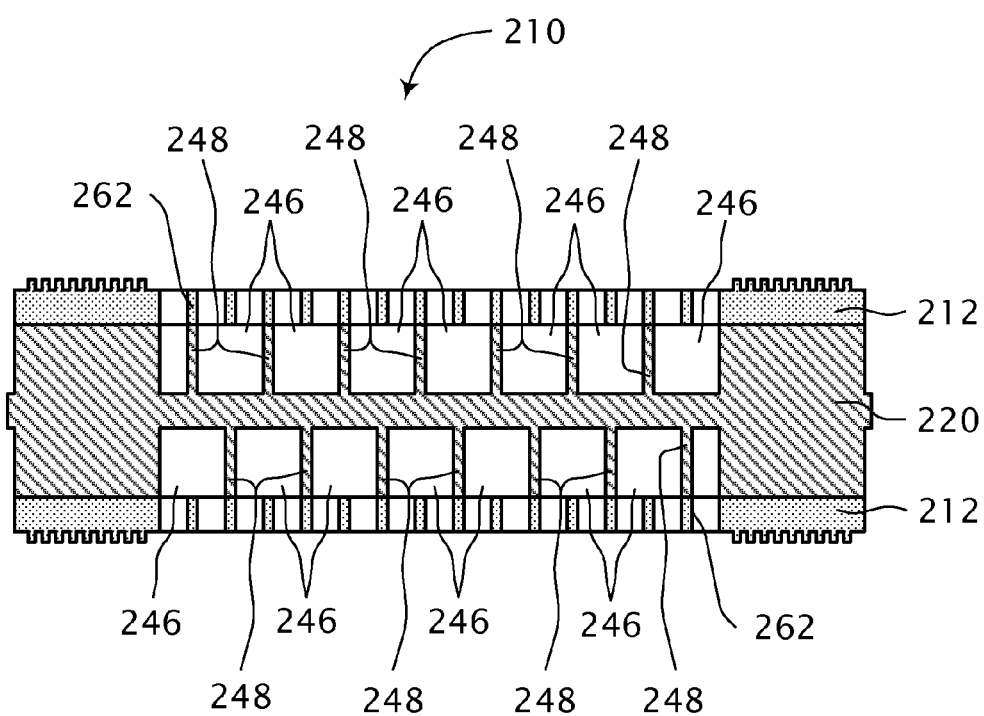
FIG. 19 is a cross sectional view of a fluid conduit illustrating a separator with a plurality of walls projecting from both sides thereof.

Referring now to FIG. 19, a fluid conduit 210 includes a support 212 similar to that described above for previous embodiments and a separator 212 similar to the separator 120 illustrated in FIG. 18. In the separator 220, walls 248 defining flow paths 246 are cast, cut, etched, or otherwise formed directly into opposing surfaces thereof such that opposing walls 248 are offset so that at least one of the walls on one side of separator 220 is positioned substantially parallel to and between the walls of the other side of the separator. At least some ribs 262 of the support 212 are supported by the walls 248. Sealing areas 234 are disposed on the supports 212. The support 212 and the separator 220 are coated with a joining compound to provide sealing engagement and electrically conductive communication therebetween, as described above for previous embodiments.

Figure 20:
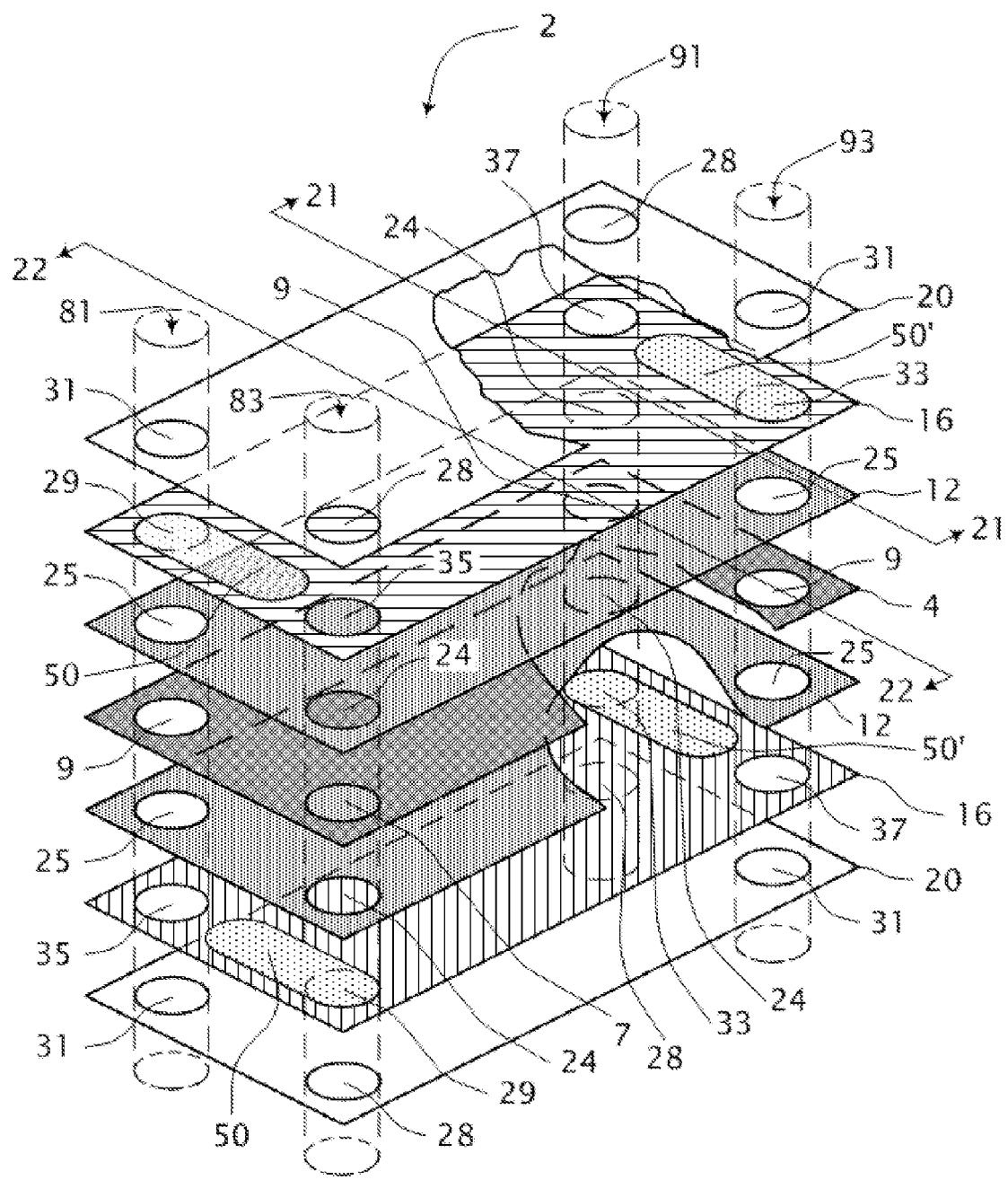
FIG. 20 is a top perspective exploded view of the electrochemical cell of the present invention with portions of one separator and one support of cut away.
Figure 21:
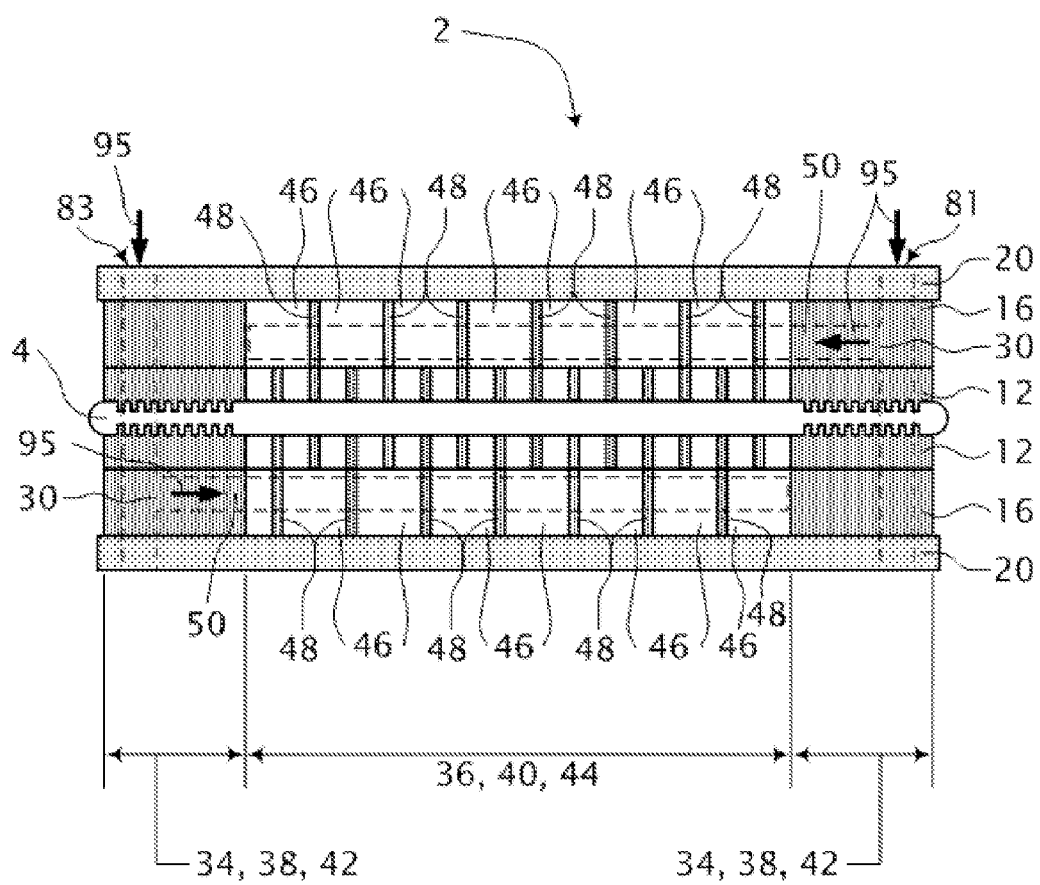
FIG. 21 is a cross sectional view of an assembled electrochemical cell, of the present invention, showing fluid communication through the inlet manifolds, the flow distribution structures and the flow paths.
Figure 22:
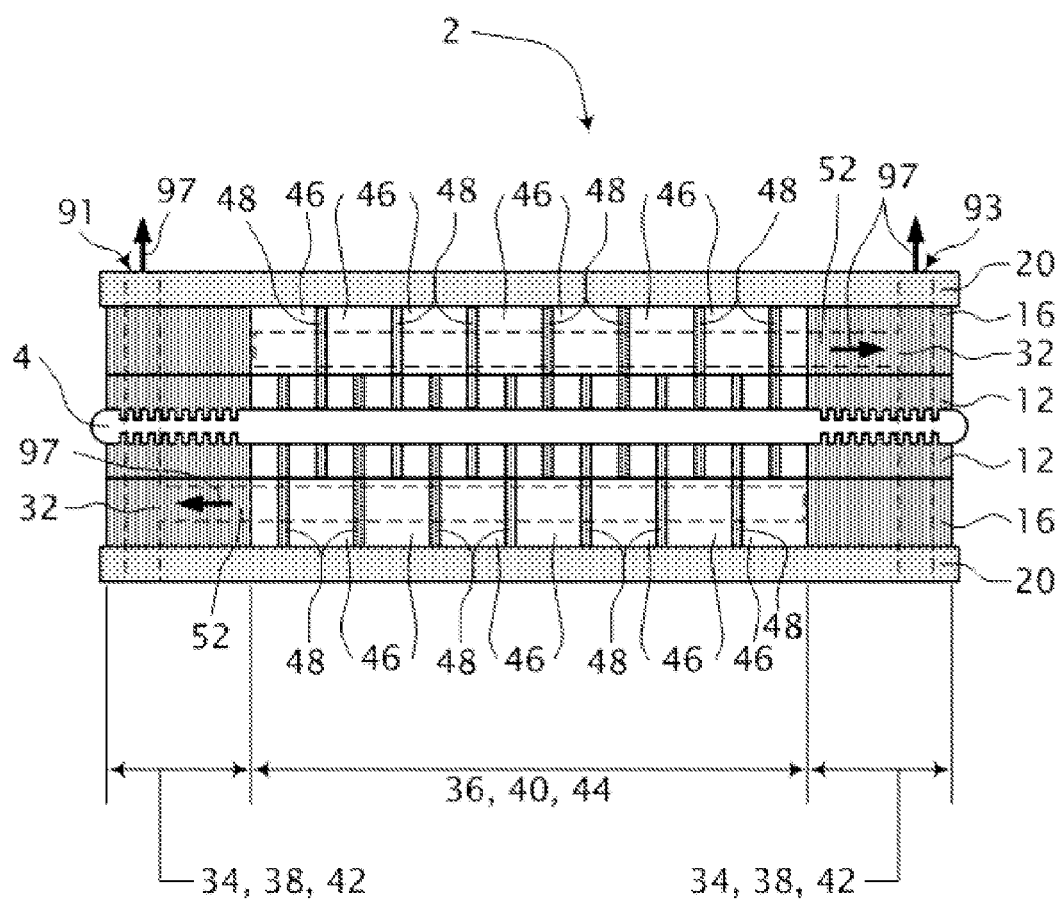
FIG. 22 is a cross sectional view of an assembled electrochemical cell, of the present invention, showing fluid communication through the outlet manifolds, the flow distribution receiving structures and the flow paths.

Referring now to FIGS. 20-22, the assembled cell 2 comprises two supports 12 positioned adjacent the electrode/electrolyte assembly 4 on opposing sides thereof, two flow plates 16 positioned adjacent each support, and two separators 20 positioned adjacent each flow plate. The flow plates 16 are positioned on opposing sides of the electrode/electrolyte assembly so that at least one of the walls 48 of one the flow plates is positioned between the walls of the other flow plate. The cell 2 is assembled such that the through holes 31, 35, 25, 9, 25, 29, and 31 of each respective component are aligned to define inlet manifold 81; through holes 28, 29, 24, 7, 24, 35, 28 of each respective component are aligned to define inlet manifold 83; through holes 31, 37, 25, 9, 25, 33, and 31 of each respective component are aligned to define the outlet manifold 93; and through holes 28, 33, 24, 9, 24, 37, and 28 of each respective component are aligned to define the outlet manifold 91 through which fluid flow can be maintained.

Referring to FIG. 21 a first process fluid is received into the inlet manifold 81 and is distributed through the flow distribution inlet 30 and to the flow plates 16 (along the flow paths 46) in the directions of arrows 95. A second process fluid is received into the inlet manifold 83 and is distributed through the flow distribution inlet 30 and to the flow plates 16 (along the flow paths 46) in the directions of arrows 95.

Referring now to FIG. 22, excess of the first process fluid from inlet manifold 81 is distributed from the flow plates 16 in the directions of arrows 97 through the flow distribution outlet 32 and received into the outlet manifold 93. Similarly, excess of the second process fluid from inlet manifold 83 is distributed from the flow plates 16 in the directions of arrows 97 through the flow distribution outlet 32 and received into the outlet manifold 91. The areas around the through holes of each of the supports 12, flow plates 16, and separators 20, as well as the areas around the active areas of each of these components, define the sealing areas.

Referring now to FIG. 22, it is sometimes advantageous to assemble electrochemical cells in mono-polar stacks. For illustration, a plurality of cells 2 can be assembled into a monopolar cell stack 100, each cell being separated by and electrically insulated from adjacent cells by the dielectric separators 20 and electrically connected by a conductor 99. Terminal conductors 92 and 94 allow the cell stack 100 to be connected to a suitable load device. Dielectric covers 104 on the terminal ends of the cell stack 100 insulate the cell stack.

Figure 23:
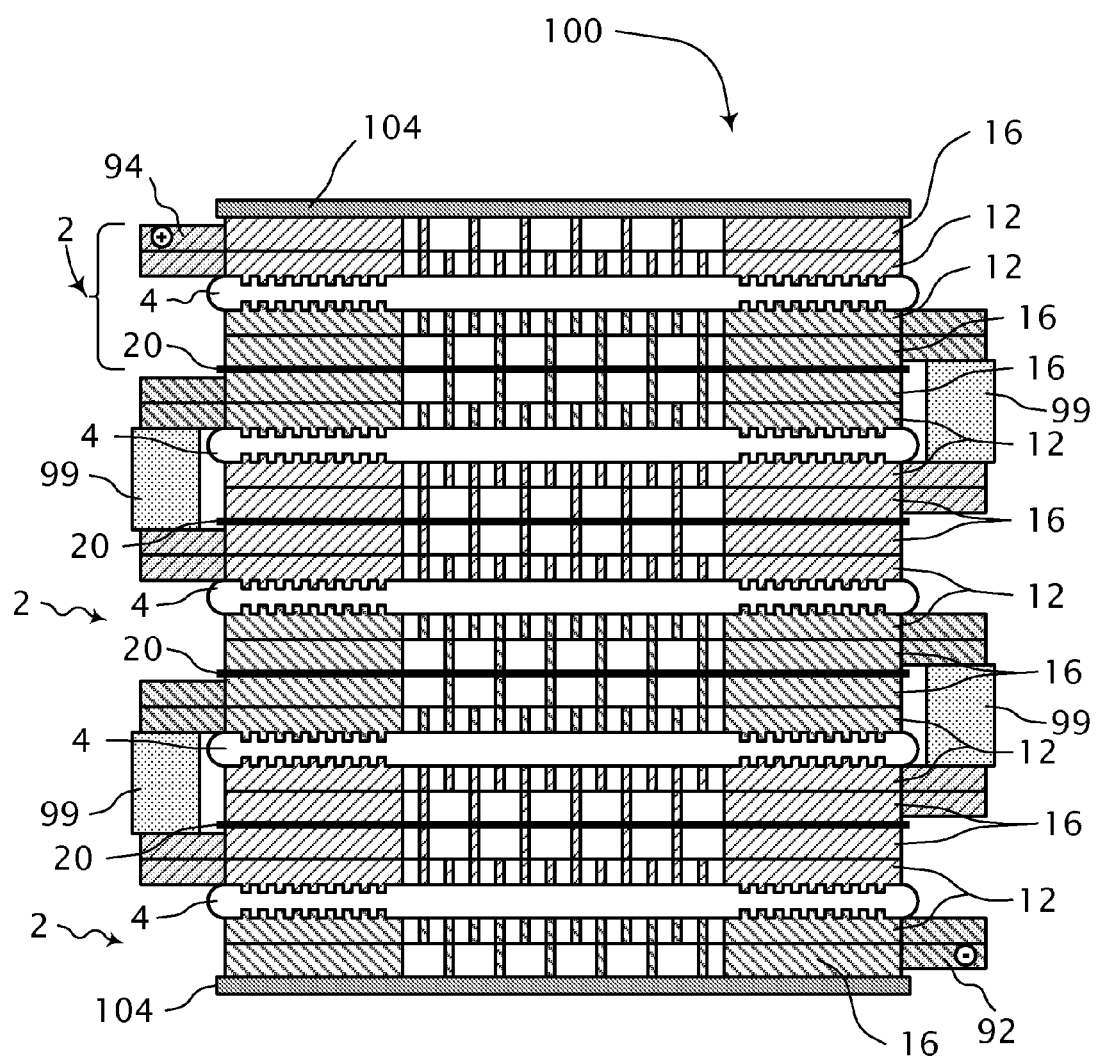
FIG. 23 is a cross sectional view of a mono-polar cell stack, of the present invention.
Figure 24:
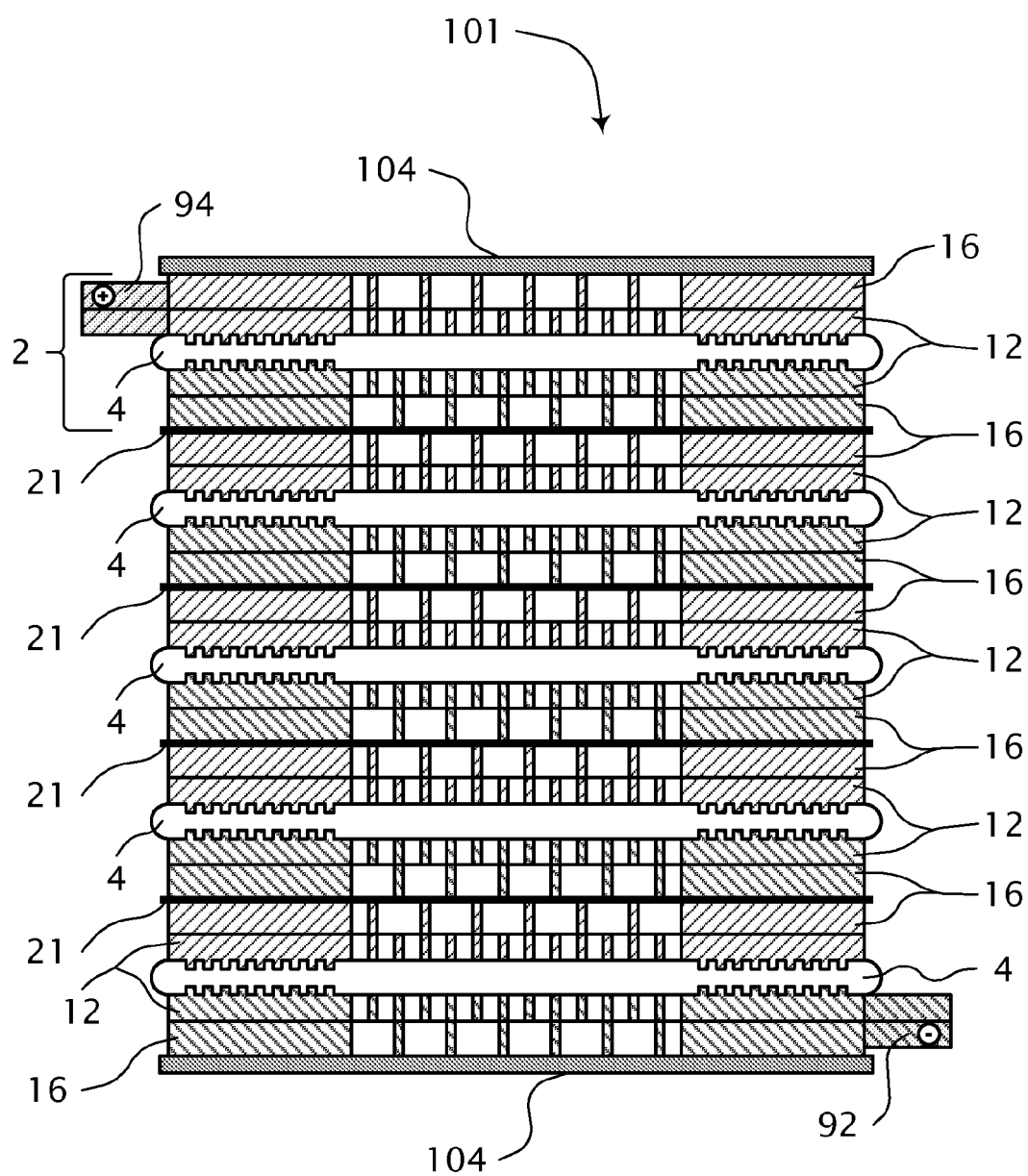
FIG. 24 is a cross sectional view of a bi-polar cell stack, of the present invention.

Referring now to FIG. 23, individual cells can be assembled in bi-polar stacks 101. For illustration, a plurality of cells 2 can be connected using bipolar separator plates 21. Bipolar separator plates 21, when assembled into a cell, are common to two fluid conduits, and electrical communication is maintained thereacross without the need for external conductors 99. Terminal conductors 92 and 94 allow the cell stack 101 to be connected to a suitable load device. Dielectric covers 104 on the terminal ends of the cell stack 101 insulate the cell stack.

The present invention includes a method for assembling an electrochemical cell 2. The method for assembling the electrochemical cell 2 includes the first step of providing an electrode-electrolyte assembly 4, two supports 12, two flow plates 16, and two separators 20. The method also includes the second step of coating at least portions of the supports 12, the flow plates 16, and the separators 20 with a uniform thickness of an electrically conductive joining compound 88. The flow plates 16 are positioned adjacent the supports 12, and the separators 20 are positioned adjacent the flow plates, thereby causing the active areas 36, 40, 44 of the supports, the flow plates, and the separators to cooperatively define flow paths 46 in fluid communication with and extending axially between the inlets and the outlets of the assembled components.

To activate the joining compound 88, the flow plates 16, the supports 12, and the separator 20 are heated. The flow plate 16, the support 12, and the separator 20 are cooled or allowed to cool, thereby causing the joining compound to cure, thereby sealably engaging the flow plate, the support, and the separator and causing electrically conductive communication therebetween.

In an assembly process, one assembly of the support 12, the flow plate 16, and the separator 20 is positioned on one side of the electrode-electrolyte assembly 4 such that the sealing areas and the active areas of the components are aligned. Another assembly of the support 12, the flow plate 16, and the separator 20 is positioned on an opposing side of the electrode-electrolyte assembly 4 such that the sealing areas and the active areas of the components are aligned and so that at least one of the walls 48 of one flow plate 16 is positioned between walls of the other flow plate. The electrode-electrolyte assembly 4 is then compressed between the assemblies to cause sealing engagement therebetween. Several cells 2 may be joined to form a cell stack.

During operation as a fuel cell, a first process fluid is caused to flow through the first plurality of flow paths 46 and a second process fluid is caused to flow through the second plurality of flow paths 46 on the opposite side of the electrode-electrolyte assembly 4 in the cell 2. For example the first process fluid can be an oxidant and the second process fluid can be a fuel. Flowing of the first and second process fluids through each of the first and second plurality of flow paths 46 such that each process fluid reacts with the electrode-electrolyte assembly 4 causes an electrochemical reaction. The electrochemical reaction results in a flow of electrical current within the cell 2.

Although the present invention has been disclosed and described with reference to certain embodiments thereof, it should be noted that other variations and modifications may be made, and it is intended that the following claims cover the variations and modifications within the true scope of the invention.

What is claimed is:

1. A fluid conduit for use in an electrochemical cell, said fluid conduit comprising:
    a support having a plurality of apertures extending therethrough and through which fluid communication can be maintained;
    a flow plate positioned adjacent said support, said flow plate including an inlet and an outlet, said flow plate having a plurality walls extending between said inlet and said outlet;
    a separator positioned adjacent said flow plate;
    wherein said support, said flow plate, and said separator are sealingly engaged with one another and cooperate to define a plurality of flow paths in fluid communication with and extending between said inlet and said outlet; and
    said support including an undulating surface defined by a plurality of adjacent peaks and valleys, said valleys extending between adjacent pairs of said walls and into a gap defined between said adjacent pairs of said walls, and wherein each of said peaks engages a portion of a corresponding one of said walls.

2. The fluid conduit of claim 1 wherein:
    said walls being substantially parallel to one another and positioned on said flow plate such that, when said flow plate is flipped 180 degrees about an axis extending along one of said walls and said flow plate is positioned on and aligned with another of said flow plates, at least one of said walls of said flow plate is positioned between said walls of the other of said flow plates.

3. The fluid conduit of claim 1 wherein:
    said support, said separator and said flow plate are metallic;
    at least a portion of said support, said separator and said flow plate each being coated with a uniform thickness of an electrically conductive joining compound for sealingly engaging said support, said separator and said flow plate in electrically conductive communication with one another.

4. The fluid conduit of claim 2 wherein:
    said apertures are defined by a plurality of axially extending ribs and a plurality of transversely extending ribs;
    said axially extending ribs being substantially parallel to said axially extending flow paths;
    at least one of said axially extending ribs being substantially aligned along an edge of one of said walls; and
    at least one of said axially extending ribs being substantially aligned between two of said walls.

5. The fluid conduit of claim 4 wherein said transversely extending ribs include a concave side facing said inlet.

6. The fluid conduit of claim 2 wherein said flow plate comprises,
    first distribution means for supplying a process fluid to said axially extending flow paths, said first distribution means being positioned adjacent to said inlet and being in fluid communication with said axially extending flow paths; and
    second distribution means for removing said process fluid from said axially extending flow paths, said second distribution means being positioned adjacent to said outlet.

7. The fluid conduit of claim 6 wherein at least one of said first and second distribution means comprises a plurality of passages extending therethrough and wherein said first and second distribution means is in fluid communication with said axially extending flow paths.

8. The fluid conduit of claim 6 wherein each of said walls has at least one transition area of reduced cross section, each of said transitions areas being disposed adjacent to one of said first distribution means and said second distribution means.

9. The fluid conduit of claim 6 wherein said walls are integral with at least one of said first and second distribution means.

10. The fluid conduit of claim 1 wherein at least a portion of one side of said peripheral sealing area of said support has an interference area for sealable engagement with an electrode-electrolyte assembly.

11. An electrochemical cell comprising:
    a first support and second support each having a plurality of apertures extending therethrough and through which fluid communication can be maintained;
    a first separator and a second separator;
    a first flow plate positioned between said first support and said first separator;
    a second flow plate positioned between said second support and said second separator; wherein each of said first and second flow plates define an inlet and an outlet, each of said first and second flow plates having a plurality of walls axially extending between each of said inlets and said outlets;
    an electrode-electrolyte assembly comprising a polymer electrolyte membrane, a first electrode positioned on said polymer electrolyte membrane, and a second electrode positioned on an opposing surface of said polymer electrolyte membrane;
    wherein said first electrode is in fluid communication with said first support and said second electrode is in fluid communication with said second support; and
    wherein said first support, said first flow plate, and said first separator cooperate to define a first plurality of flow paths in fluid communication with and extending axially between said inlet and said outlet of said first flow plate, and
    wherein said second support, said second flow plate, and said second separator cooperate to define a second plurality of flow paths in fluid communication with and extending axially between said inlet and said outlet of said second flow plate; and
    at least one of said first and second supports including an undulating surface defined by a plurality of adjacent peaks and valleys, said valleys extending between adjacent pairs of said walls and into a gap defined between said adjacent pairs of said walls, and wherein each of said peaks engages a portion of a corresponding one of said walls, of one of said first and second flow plates.

12. The electrochemical cell of claim 11 wherein:
at least one of said walls of first flow plate is positioned between said walls of second flow plate.

13. The electrochemical cell of claim 11 wherein:
said first and second supports, said first and second separators and said first and second flow plates are metallic;
said first and second supports, said first and second separators and said first and second flow plates each being coated with a uniform thickness of an electrically conductive joining compound for sealingly engaging said first support, said first separator and said first flow plate in electrically conductive communication with one another and for sealingly engaging said second support, said second separator and said second flow plate in electrically conductive communication with one another.

14. The electrochemical cell of claim 11 wherein at least a portion of one side of said peripheral sealing area of said first and second supports has an interference area for sealable engagement with said electrode-electrolyte assembly.

15. The electrochemical cell of claim 11 further including a plurality of said first supports and said second supports; a plurality of said first separators and said second separators; and a plurality of said first flow plates and said second flow plates; wherein at least one of said first separators and said second separators is a bipolar separator; and wherein at least one pair of said first flow plates and said second flow plates has a bipolar separator disposed therebetween.

16. The electrochemical cell of claim 11 further including a plurality of said first supports and said second supports; a plurality of said first separators and said second separators; and a plurality of said first flow plates and said second flow plates; wherein at least one of said first separators and said second separators is a dielectric separator; and wherein at least one pair of said first flow plates and said second flow plates has a dielectric separator disposed therebetween.

17. The electrochemical cell of claim 11, wherein said valleys are formed by moving a portion of said electrode-electrolyte assembly into at least one of said first and second supports.

18. The electrochemical cell of claim 11, wherein at least one of said first and second supports is elastically deformable.

19. The electrochemical cell of claim 11, wherein at least one of said first and second supports define a peripheral sealing area.

20. The electrochemical cell of claim 11, wherein said walls extend axially between respective pairs of said inlets and said outlets.

21. The fluid conduit of claim 1, wherein said support is elastically deformable.

22. The fluid conduit of claim 1, wherein said support defines a peripheral sealing area.

23. The fluid conduit of claim 1, wherein said walls extend axially between said inlet and said outlet.

* * * * *